(12) United States Patent
Pabon et al.

(10) Patent No.: US 7,623,412 B2
(45) Date of Patent: Nov. 24, 2009

(54) ANISOTROPY MEASUREMENT WHILE DRILLING

(75) Inventors: Jahir Pabon, Wellesley, MA (US);
Chaur-Jian Hsu, Danbury, CT (US);
Bikash K. Sinha, West Redding, CT (US)

(73) Assignee: Schlumberger Technology Corporation, Ridgefield, CT (US)

( * ) Notice: Subject to any disclaimer, the term of this patent is extended or adjusted under 35 U.S.C. 154(b) by 227 days.

(21) Appl. No.: 11/369,433

(22) Filed: Mar. 7, 2006

(65) Prior Publication Data

US 2007/0268782 A1     Nov. 22, 2007

(51) Int. Cl.
*G01V 1/00* (2006.01)
(52) U.S. Cl. .................. 367/75; 702/9; 166/254.2
(58) Field of Classification Search .............. 367/87, 367/75; 702/9; 166/254.2
See application file for complete search history.

(56) References Cited

U.S. PATENT DOCUMENTS

| | | | | |
|---|---|---|---|---|
| 5,036,945 | A | 8/1991 | Hoyle et al. | 181/104 |
| 5,136,554 | A | 8/1992 | Thomsen et al. | 367/75 |
| 5,278,805 | A | 1/1994 | Kimball | 367/32 |
| 5,402,392 | A * | 3/1995 | Lu et al. | 367/75 |
| 5,657,294 | A | 8/1997 | Zhang | 367/75 |
| 5,808,963 | A | 9/1998 | Esmersoy | 367/31 |
| 5,852,587 | A | 12/1998 | Kostek et al. | 367/25 |
| 6,474,439 | B1 | 11/2002 | Hoyle et al. | 181/102 |
| 6,526,354 | B2 * | 2/2003 | Bose et al. | 702/14 |
| 6,631,327 | B2 | 10/2003 | Hsu et al. | 702/6 |
| 6,718,266 | B1 | 4/2004 | Sinha et al. | 702/11 |
| 6,739,423 | B2 | 5/2004 | Tashiro et al. | 181/105 |
| 2003/0010494 | A1 * | 1/2003 | Bose et al. | 166/254.2 |
| 2003/0206488 | A1 | 11/2003 | Blanch et al. | 367/38 |
| 2004/0257911 | A1 | 12/2004 | Tang et al. | 367/81 |
| 2005/0000688 | A1 | 1/2005 | Hsu et al. | 166/254.2 |

OTHER PUBLICATIONS

Alford, R.M. "Shear Data in the Presence of Azimuthal Anisotropy: Dilley, Texas." Expanded Abstracts, 56$^{th}$ SEG Annual International Meeting and Exposition, Houston, TX, Nov. 2-6, 1986, paper S9.6.
Brie, Alain et al. "New Directions in Sonic Logging." Oilfield Review, Spring 1998, pp. 40-55.
Ekstrom, Michael P. "Dispersion Estimation from Borehole Acoustic Arrays Using a Modified Matrix Pencil Algorithm." Proceedings of the 29$^{th}$ Asilomar Conference on Signals, Systems, and Computers, Pacific Grove, California 1995, pp. 449-453.

(Continued)

*Primary Examiner*—Mark Hellner
(74) *Attorney, Agent, or Firm*—Helene Raybaud; James McAleenan; Jody Lynn DeStefanis

(57) ABSTRACT

Methods and apparatus facilitating measurement of anisotropy are disclosed. According to some aspects, anisotropy can be determined while drilling. Monopole/quadrupole interactions, as well as monitoring dipole excitations and other methods, may be used to find the principal shear directions of a formation while drilling or during wireline or other operations.

18 Claims, 28 Drawing Sheets

OTHER PUBLICATIONS

Harrison et al. "Acquisition and Analysis of Sonic Waveforms from a Borehole Monopole and Dipole Source for the Determination of Compressional and Shear Speeds and Their Relation to Rock Mechanical Properties and Surface Seismic Data." Society of Petroleum Engineers, SPE 20557, 1990.

Kimball et al. "Semblance processing of borehole acoustic array data." Geophysics, vol. 49, No. 3 (Mar. 1984): pp. 274-281.

Lang et al. "Estimating slowness dispersion from arrays of sonic logging waveforms." Geophysics, vol. 52, No. 4 (Apr. 1987): pp. 530-544.

UK Intellectual Property Office Combined Search and Examination Report under Sections 17 and 18(3) dated Jun. 20, 2007 for Application No. GB0703936.5.

* cited by examiner

Dipole source axis at 30 deg relative to SLOW direction

Dipole source axis at 30 deg relative to FAST direction

Overlay of two sets of in-line dipole traces

ANISOTROPY MEASUREMENT WHILE DRILLING

BACKGROUND

It is well known that mechanical disturbances can be used to establish elastic waves in earth formations surrounding a borehole, and the properties of these waves can be measured to obtain important information about the formations through which the waves have propagated. Parameters of compressional, shear and Stoneley waves can be indicators of formation characteristics. In particular, wave velocity (or its reciprocal, slowness) helps in evaluation of the location and/or producibility of hydrocarbon resources.

One example of a logging device that has been used to obtain and analyze acoustic measurements of formations surrounding an earth borehole is a Dipole Shear Sonic Imager ("DSI"—trademark of Schlumberger), and is of the general type described in Harrison et al., "Acquisition and Analysis of Sonic Waveforms From a Borehole Monopole And Dipole Source For The Determination Of Compressional And Shear Speeds And Their Relation To Rock Mechanical Properties And Surface Seismic Data." Society of Petroleum Engineers, SPE 20557, 1990. According to conventional use of the DSI logging tool, one can present compressional slowness, $\Delta t_c$, average shear slowness, $\Delta t_s$, and Stoneley slowness, $\Delta t_{st}$, each as a function of depth, z (slowness corresponds to an interval wave transit time typically measured by sonic logging tools).

An acoustic source in a fluid-filled borehole generates headwaves, as well as relatively stronger borehole-guided modes. A standard sonic measurement system includes a piezoelectric source and hydrophone receivers inside a fluid-filled borehole. The piezoelectric source may be either a monopole or a dipole source. The source bandwidth typically ranges from a 0.5 to 20 kHz. A monopole source primarily generates the lowest-order axisymmetric mode, also referred to as the Stoneley mode, along with compressional and shear headwaves. In contrast, a dipole source primarily excites the lowest-order flexural borehole mode together with compressional and shear headwaves. The headwaves are caused by the coupling of the transmitted acoustic energy to plane waves in the formation that propagate along the borehole axis. An incident compressional wave in the borehole fluid produces critically refracted compressional waves in the formation. The waves refracted along the borehole surface are known as compressional headwaves. The critical incidence angle is represented as $\theta_i = \sin^{-1}(V_f/V_c)$, where $V_f$ is the compressional wave speed through the borehole fluid and $V_c$ is the compressional wave speed through the formation. As a compressional headwave travels along an interface, it radiates energy back into the fluid that can be detected by the hydrophone receivers placed in the fluid-filled borehole. In relatively fast formations, the shear headwave can be similarly excited by a compressional wave at the critical incidence angle $\theta_i = \sin^{-1}(V_f/V_s)$, where $V_s$ is the shear wave speed through the formation. It is also worth noting that headwaves are excited only when the wavelength of the incident wave is smaller than the borehole diameter so that the boundary can be effectively treated as a planar interface. In a homogeneous and isotropic model of fast formations, as above noted, compressional and shear headwaves can be generated by a monopole source placed in a fluid-filled borehole to determine the formation compressional and shear wave speeds. However, refracted shear headwaves cannot be detected for slow formations (where the shear wave velocity is less than the borehole-fluid compressional wave velocity) with receivers placed in the borehole fluid. Therefore, formation shear velocities are obtained from the low-frequency asymptote of flexural dispersion for slow formations. There are standard processing techniques for the estimation of formation shear velocities in either fast or slow formations from an array of recorded dipole waveforms.

Both the monopole and dipole waveforms recorded at an array of receivers can be processed by a modified matrix pencil algorithm that isolates non-dispersive and dispersive arrivals in the wave train. The compressional headwave velocity is the formation quasi-compressional (qP-) wave velocity along the borehole axis. The zero-frequency intercept of the lowest-order axisymmetric Stoneley dispersion yields the tube wave velocity (VT) along the borehole axis. The formation quasi-shear (qSV-) and shear (SH-) velocities are obtained from the low-frequency asymptotes of the two orthogonally polarized borehole flexural waves propagating along the borehole axis.

Sedimentary rocks frequently possess an anisotropic structure resulting, for example, from thin bedding, fine scale layering, the presence of oriented microcracks or fractures, or the preferred orientation of nonspherical grains or anisotropic minerals. This type of anisotropy is called formation intrinsic anisotropy. A dipole dispersion crossover is an indicator of stress-induced anisotropy dominating any intrinsic anisotropy that may also be present.

Failure to properly account for anisotropy in seismic processing may lead to errors in velocity analysis, normal moveout (NMO) correction, dip moveout (DMO) correction, migration, time-to-depth conversion and amplitude versus offset (AVO) analysis.

Typical logging devices such as the DSI are generally quite flexible and therefore approximately "acoustically transparent." The advantage of typical flexible logging devices is the acoustic transparency, which allows any signal propagation through the tool to be ignored. Accordingly, typical sonic data is collected and processed independent of tool effects. However, it has been more and more common for users to demand logging information while a borehole is being drilled. Logging while drilling (LWD) or measurement while drilling (MWD) is commonplace, but the measurements or logs available while drilling are limited. Because of mechanical strength constraints imposed on the drilling collar, it is not possible to place flexible isolation joints between sources and receivers, nor to have a flexible receiver section to slow down the propagation of direct tool signals. As a result, if a dipole mode of excitation is used (which is the typical technique used for shear speed extraction in wireline logging operations), there is appreciable interference between the formation and tool borne signals reaching the receivers. Therefore, a quadrupole mode of excitation is currently most recommended for average shear extraction. See, e.g., U.S. Patent Application Publication No. 2005/0000688, hereby incorporated in its entirety by this reference. However, measurements of shear (which is short-hand for average shear) while drilling, even using quadrupole mode, do not provide any information about formation anisotropy.

SUMMARY

The present disclosure addresses the above-described deficiencies and others. Specifically, the discussion below provides methods and apparatus for finding anisotropy in formations traversed by a wellbore. Some methods and apparatuses include LWD tools and methods. Some methods and apparatus facilitate finding principal shear directions (which may include identifying which direction is fast and which direction is slow) in a formation while drilling.

One aspect provides a method of logging a subterranean formation. The method comprises logging while drilling a borehole, the logging while drilling comprising exciting a wave mode with an LWD tool, receiving wave data from waves traveling through the formation, and identifying principal shear directions of the subterranean formation while drilling based on the wave data received while drilling by the LWD tool. In one aspect, each of the fast and slow directions is specifically identified. In one aspect, exciting a wave mode comprises exciting a dipole mode. According to one aspect, exciting a dipole mode comprises firing a dipole transmitter in two orthogonal directions. In one aspect, exciting a dipole mode comprises firing a dipole transmitter in a first position, rotating the LWD tool ninety degrees and firing the dipole transmitter in a second position.

According to one aspect of the method, exciting a wave mode comprises exciting dipole modes in orthogonal directions, and the method further comprises performing an Alford rotation on the received dipole wave data to identify the principal shear directions at a given depth (or tool position/ location). In one embodiment, exciting a wave mode comprises exciting a dipole mode in orthogonal directions, and the method further comprises performing an Alford rotation on the received wave data, including tool signal data, to identify the principal (fast, slow) shear directions at a given depth (or tool position/location).

According to one aspect, exciting a dipole mode comprises firing a dipole transmitter at two orthogonal positions, receiving wave data comprises receiving combined signals resulting from wave propagation through both the formation and the LWD tool, and performing an Alford rotation on the combined signals to measure anisotropy of the formation.

According to one aspect, exciting a wave mode comprises initially exciting a monopole mode, observing any quadrupole modes induced or resulting from the initially excited monopole mode, and identifying the principal shear directions of the subterranean formation while drilling comprises monitoring monopole/quadrupole interactions that arise because of the rock anisotropy. In one aspect, identifying the principal shear directions of the subterranean formation while drilling comprises identifying orthogonal directions, perpendicular to the borehole, along which the quadrupole mode has maximum energy, identifying a fast of the two directions at a negative correlation between the monopole and quadrupole modes, and identifying a slow of the two directions at a positive correlation between the monopole and quadrupole modes.

In one aspect, exciting a wave mode comprises exciting a monopole, a dipole, and a monopole-induced quadrupole mode, and identifying principal shear directions further comprises performing an Alford rotation on received dipole wave data to identify a first measurement of the principal shear directions, identifying orthogonal directions—perpendicular to the borehole—along which received quadrupole wave data has maximum energy as a second measurement of the principal shear directions, identifying a fast direction of the two orthogonal directions at a negative correlation between monopole and quadrupole received data, identifying a slow of the two orthogonal directions at a positive correlation between the monopole and quadrupole received data, and comparing the first and second measurements of the principal shear directions. One aspect further comprises averaging the first and second measurements of the principal shear directions.

One embodiment includes an apparatus comprising a logging while drilling (LWD) tool. The LWD tool comprises a drill string, a drill bit attached to the drill string, a transmitter capable of dipole firing disposed in a drill collar of the drill string, a receiver comprising at least four orthogonal acoustic sensors disposed in the drill string and spaced the transmitter, and a set of instructions that, when executed, perform an Alford rotation on dipole data received from orthogonal dipole firings by the receiver. In one embodiment the transmitter is capable of exciting monopole, dipole, and quadrupole acoustic wave modes. In one embodiment the transmitter is capable of exciting monopole and dipole acoustic waves, and the monopole waves may induce quadrupole acoustic wave modes in the presence of anisotropy. One embodiment further comprises at least eight receiver stations, each receiver station comprising a receiver having at least four orthogonal acoustic sensors. In one embodiment each receiver station comprises a receiver having at least eight equally-spaced azimuthal acoustic sensors.

According to one embodiment the set of instructions, when executed, identify orthogonal principal shear directions, perpendicular to the borehole, along which received quadrupole wave data has maximum energy. In one embodiment, the set of instructions, when executed identify a fast of the two orthogonal directions at a negative correlation between monopole and quadrupole received data, and identify a slow of the two orthogonal directions at a positive correlation between the monopole and quadrupole received data.

One embodiment comprises a logging while drilling (LWD) tool, the LWD tool comprising a drill string, a drill bit attached to the drill string, an acoustic transmitter capable of firing in two orthogonal directions (simultaneously or following a tool rotation) disposed in a drill collar of the drill string, a receiver having at least four orthogonal acoustic sensors disposed in the drill string and spaced from acoustic transmitter, and a set of instructions that, when executed, identify orthogonal principal shear directions, perpendicular to the borehole, along which received quadrupole wave data has maximum energy. In one embodiment, the set of instructions, when executed, identify a fast of the two orthogonal directions at a negative correlation between monopole and quadrupole received data, and identify a slow of the two orthogonal directions at a positive correlation between the monopole and quadrupole received data. In one embodiment, the set of instructions, when executed, perform an Alford rotation on dipole data received by the receiver. In one embodiment of the LWD tool, the acoustic transmitter is capable of exciting monopole, dipole, and quadrupole acoustic wave modes One aspect provides a method comprising measuring anisotropy of a formation while drilling. Measuring anisotropy while drilling comprises exciting a dipole wave mode in two orthogonal directions with an LWD tool, receiving and recording in-line and cross-line dipole wave data comprising combined signals resulting from dipole wave propagation through both the formation and the LWD tool, performing an Alford rotation on the combined signals to determine anisotropy of the formation—which may include identifying fast and slow shear directions of the formation—exciting monopole wave modes with the LWD tool, receiving monopole and monopole-induced quadrupole wave data resulting from monopole wave propagation through both the formation and the LWD tool, finding orthogonal principal shear directions characterizing anisotropy by observing directions in which received quadrupole wave data has maximum energy, identifying a fast of the two orthogonal directions characterizing anisotropy at a negative correlation between monopole and quadrupole received data, and identifying a slow of the two orthogonal directions characterizing anisotropy at a positive correlation between the monopole and quadrupole received data. In one aspect, the method further comprises considering anisotropy measured from the dipole wave data and the monopole/quadrupole interaction data to evaluate anisotropy. In one aspect, the method further comprises averaging results of anisotropy measured from the dipole wave data and the monopole/quadrupole interaction data. In one aspect, the method includes receiving dipole, monopole, and quadrupole wave data at eight receiver stations, each receiver having eight azimuthal sensors.

Additional features will be set forth in the description which follows or may be learned by those skilled in the art through reading these materials or practicing the invention. The principles described herein may be achieved through the means recited in the attached claims.

BRIEF DESCRIPTION OF THE DRAWINGS

The accompanying drawings illustrate preferred embodiments of the present invention and are a part of the specification. Together with the following description, the drawings demonstrate and explain the principles of the present invention.

Figure 1:
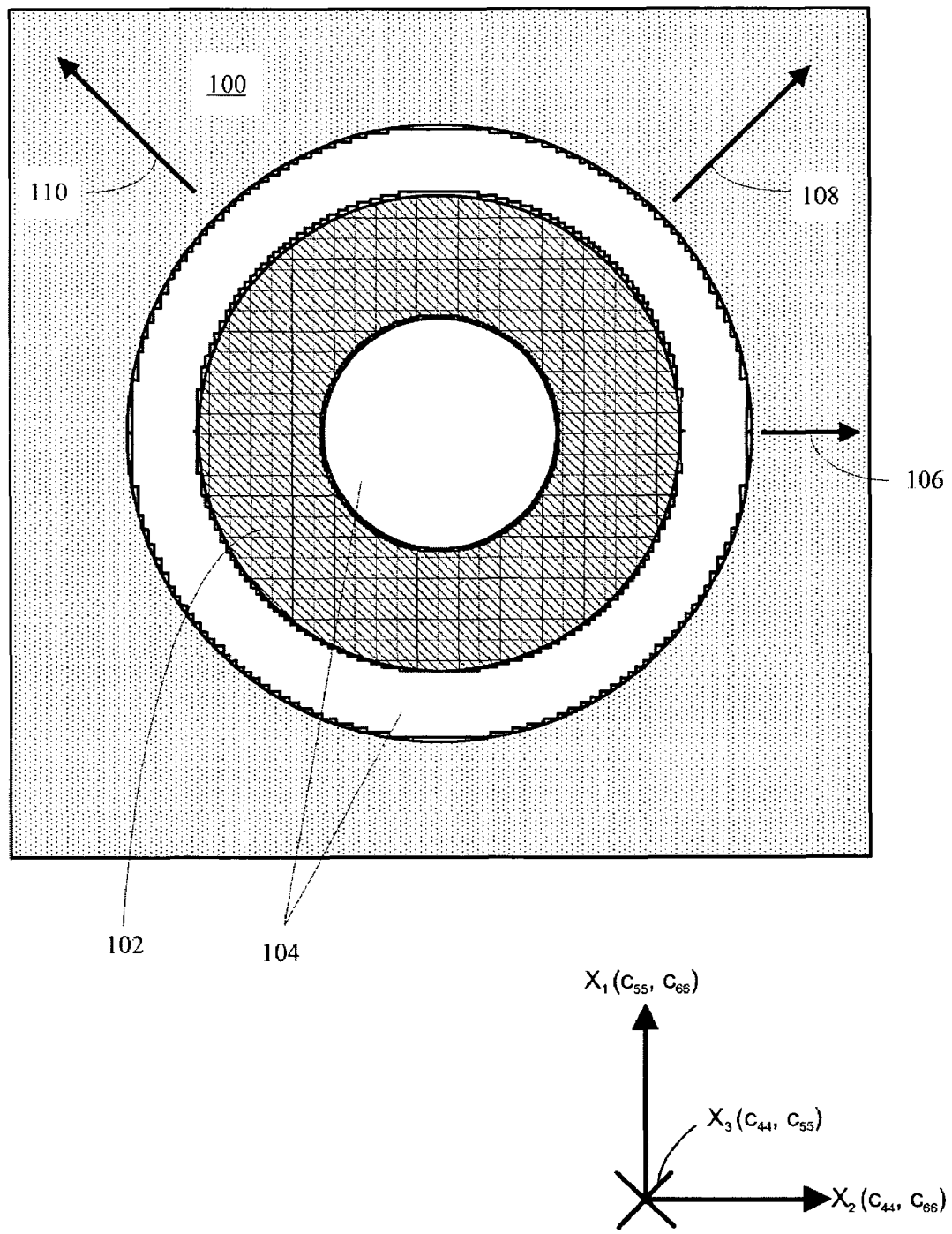
FIG. 1 is a schematic cross-sectional diagram of a well and logging-while-drilling tool, together with measurement axes.

Throughout the drawings, identical reference characters and descriptions indicate similar, but not necessarily identical elements. While the invention is susceptible to various modifications and alternative forms, specific embodiments have been shown by way of example in the drawings and will be described in detail herein. However, it should be understood that the invention is not intended to be limited to the particular forms disclosed. Rather, the invention is to cover all modifications, equivalents and alternatives falling within the scope of the invention as defined by the appended claims.

DETAILED DESCRIPTION OF THE PREFERRED EMBODIMENTS

Illustrative embodiments and aspects are described below. It will of course be appreciated that in the development of any such actual embodiment, numerous implementation-specific decisions must be made to achieve the developers' specific goals, such as compliance with system-related and business-related constraints, which will vary from one implementation to another. Moreover, it will be appreciated that such a development effort might be complex and time-consuming, but would nevertheless be a routine undertaking for those of ordinary skill in the art having the benefit of this disclosure.

The principles described herein contemplate, among other things, methods and apparatus for finding or measuring anisotropy while drilling. The principles may also be applied, however, to wireline logging. The principles described herein enable identification of principal shear directions of a subterranean formations while drilling based on wave data received while the drilling operation takes place. Monople, dipole, and quadrupole wave modes may be used to identify anisotropy while drilling according to some aspects. In some aspects, dipole wave modes are used to extract anisotropy, in others, monopole/quadrupole interaction is used to extract anisotropy, and in other both dipole modes and monopole/quadrupole interactions are used to identify principal shear directions, including which direction is fast and which is slow.

As used throughout the specification and claims, the terms "borehole" or "downhole" refer to a subterranean environment, particularly in a wellbore. The terms "shear direction," "principal shear directions" refer to the two orthogonal directions representing the directions shear velocity is fastest and slowest in a given formation. "Shear direction" is distinguished from "shear," which represents an average value of shear velocity or slowness, rather than a direction. "Anisotropy" refers to variation of a property of a material with the direction in which it is measured. In a subterranean formation rock, anisotropy means variation in seismic velocity (or slowness) measured parallel or perpendicular to, for example, bedding surfaces. Therefore, finding or measuring "anisotropy" refers to identifying principal shear directions (fast and slow directions at a given azimuth), rather than average shear values, of a formation, and may include identifying which principal direction is fast and which is slow. The words "including" and "having," as used in the specification, including the claims, have the same meaning as the word "comprising."

Sedimentary rocks frequently possess an anisotropic structure resulting, for example, from thin bedding, fine scale layering, the presence of oriented microcracks or fractures of the preferred orientation of nonspherical grains, or anistropic minerals. This type of anisotropy is called formation intrinsic anisotropy. A dipole dispersion crossover is an indicator of stress-induced anisotropy dominating any intrinsic anisotropy that may also be present.

In an orthorhombic formation, an $X_3$-axis is assigned to be parallel to the borehole axis. The elastic constants, in reference to the borehole axes, take $$C = \begin{bmatrix} c_{11} & c_{12} & c_{13} & 0 & 0 & 0 \\ c_{12} & c_{22} & c_{23} & 0 & 0 & 0 \\ c_{13} & c_{23} & c_{33} & 0 & 0 & 0 \\ 0 & 0 & 0 & c_{44} & 0 & 0 \\ 0 & 0 & 0 & 0 & c_{55} & 0 \\ 0 & 0 & 0 & 0 & 0 & c_{66} \end{bmatrix},$$

where the nine independent elastic moduli are $c_{11}$, $c_{12}$, $C_{13}$, $c_{22}$, $c_{23}$, $C_{33}$, $C_{44}$, $C_{55}$, and $c_{66}$.

FIG. 1 illustrates a cross-sectional diagram of a borehole together with the orthogonal principal measurement axes $X_1$, $X_2$, and $X_3$. Identification of the principal shear directions (and which direction is fast and which is slow) of a formation at a given azimuth can be useful for the evaluation of formations for the presence and/or producibility of hydrocarbons.

Dipole excitation is commonly used in wireline sonic logging. The borehole flexural mode excited by a dipole source is recorded as it travels along the borehole, and the rock shear speed is obtained by appropriate processing of those traces. Any tool modes excited by the source are typically prevented from reaching the receiver section with the use of flexible isolation joints between source and receivers. The receiver section of the wireline sonic tool is also typically designed to be flexible enough so that its own flexural mode is much slower than the shear speed of the slowest rock the tool is intended to measure, and therefore will not interfere with the rock signal.

Additionally, when the formation or rock is anisotropic, the Alford rotation technique may be used in the process of identifying the principal fast/slow shear directions of the rock. See Alford, R. M. "Shear Data in the Presence of Azimuthal Anisotropy: Dilley, Tex.," *Expanded Abstracts*, 56th SEG Annual International Meeting and Exposition, Houston, Tex., Nov. 2-6, 1986, paper S9.6. See also Brie, Alain et al., "New Directions in Sonic Logging," OILFIELD REVIEW, Spring 1998, pp. 40-55. When a fired dipole source is aligned with either the principal fast or slow direction of the rock, the dipole field generated in the borehole will be aligned with the source. Therefore a measurement of the dipole field perpendicular to the source (cross-line dipole) will contain zero (or minimal) energy. If the dipole source is not aligned with any of the fast/slow rock directions, one finds that the generated dipole field will not be aligned with the source and therefore there will be cross-line dipole energy. However, instead of rotating the tool to search for the direction where the cross-line dipole energy is minimal, tools such as those described herein may have two orthogonal dipole sources, and enough azimuthal sensors (at least four) to measure both in-line and cross-line dipole energy after each source fires. Using the in-line and cross-line measurements, Alford rotation "rotates the dipole" mathematically using a well established expression describing the physics of the propagation of the dipole field in anisotropic rock to find the minimal energy directions. Id.

According to one embodiment, for example a Logging While Drilling (LWD) application, because of mechanical strength constraints placed on the drilling collar, it is not possible to place flexible isolation joints between source and receivers, nor to have a flexible receiver section to slow down propagation of tool flexural modes. However, according to some aspects, the Alford rotation technique is used to identify the principal or fast/slow shear directions of the rock, even when the in-line and cross-line dipole traces are "contaminated" with a tool collar flexural wave mode. The inventors have found that the Alford rotation can be successfully performed on the recorded waveforms provided those waveforms contain formation flexural energy even when contaminated with tool signals. Nevertheless, when the dipole source is aligned with one of the principal shear directions of an adjacent formation, the dipole source does not excite any dipole energy on the orthogonal direction (i.e., there is no cross-line dipole energy), provided the tool is appropriately symmetric with respect to the direction of the dipole source. Therefore, in an LWD application, the technique of finding the directions where the cross-line dipole energy is minimal identifies the principal shear directions of the rock. Further, this technique identifies which principal shear direction is fast and which principal direction is slow. Results of computer simulations verifying the identification of principal shear directions based on received dipole data are presented below.

Consider the case of two 8.5" boreholes in TI (transversely isotropic) rocks with its symmetry axis parallel to the $X_1$-axis, whose TI properties are shown in Table 1 below. We assume the borehole axis $X_3$ to be perpendicular to the transverse isotropy (TI) or symmetry axis 106 of the rock or formation 100.

TABLE 1

Properties of materials used in study

|  | Austin Chalk | Bakken Shale | Collar (Steel) | Mud (water) |
|---|---|---|---|---|
| Density, $\rho$ (kg/m$^3$) | 2200 | 2230 | 7830 | 1000 |
| $c_{11}$ (Pa) | 1.4E10 | 2.69E10 | 2.5E11 | 2.25E9 |
| $c_{22} = c_{33}$ (Pa) | 2.2E10 | 4.09E10 | 2.5E11 | 2.25E9 |
| $c_{12} = c_{13}$ (Pa) | 1.2E10 | 8.5E9 | 9.26E10 | 2.25E9 |
| $c_{23}$ (Pa) | 1.58E10 | 1.03E10 | 9.26E10 | 2.25E9 |
| $c_{55} = c_{66}$ (Pa) | 2.4E9 | 1.05E10 | 7.87E10 | 0 |
| $c_{44}$ (Pa) (derived) | 3.1E9 | 1.53E10 | 7.87E10 | 0 |

The borehole or drilling mud 104 (FIG. 1) was assumed to be water. The tool 102 (FIG. 1) was approximated as a smooth drilling collar (i.e., LWD application) made of steel. The drilling collar has a 6¾" OD (outer diameter) and 3¼" ID (inner diameter). The Austin Chalk is relatively slow with fast/slow shear slowness of 257 and 292 μsec/ft respectively (both slower than the 203 μsec/ft mud slowness), while the Bakken Shale is a fast rock with fast/slow shear slowness of 116 and 140 μsec/ft (both faster than the drilling mud).

Figure 2:
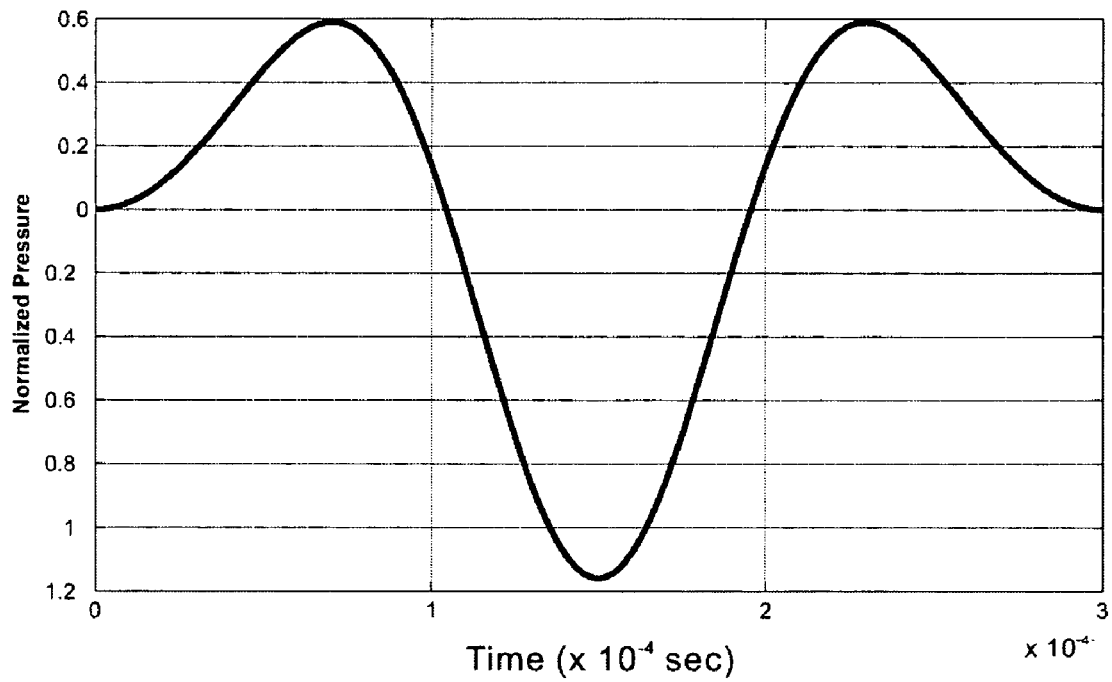
FIG. 2 illustrates an acoustic source signal and its frequency content.
Figure 2:
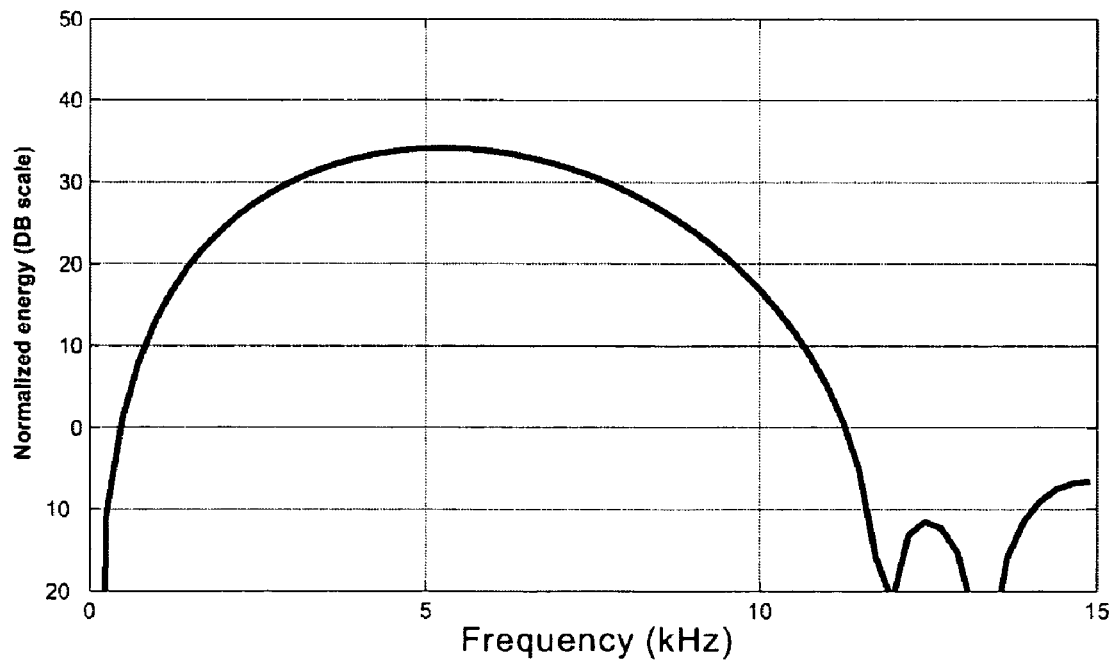

An acoustic transmitter was approximated as a ring of point pressure sources in the mud outside the collar and very close to the collar OD. The source time signature was the second derivative of the Blackman-Harris window with a 5 kHz center frequency. The Blackman-Harris window is well known to those of skill in the art having the benefit of this disclosure. In addition, FIG. 2 illustrates a source and its frequency content. The strength of the point sources in the ring was modulated using a $\cos(\theta-\theta_0)$ law, where $\theta$ denotes the azimuth angle with respect to the rock TI axis 106, and $\theta_0$ is the intended direction of the dipole source. For each rock we ran two dipole source directions. The first dipole source was oriented at 30° with respect to the rock TI axis (which for the rocks considered corresponds to the slow direction), and the second one 90° apart from the first (i.e., at 30° with respect to the fast direction of the rock). In all runs the receivers were approximated as rings of pressure sensors similarly placed in the mud outside the collar and very close to the collar OD. We used eight receiver rings with 4" axial spacing, the first ring lay at 6 ft from the source, and the last one at 8⅓ft. Each sensor in a ring was individually recorded, and the in-line and cross-line dipole components of the pressure field were extracted from the array of azimuthal traces.

Using a 3D Cartesian elastic finite differences code (for example a 3D Cartesian finite difference code to model the propagation of acoustic/elastic waves in orthotropic material with planes of symmetry aligned with the grid) allowed orthotropic material properties to be incorporated into the model as long as the principal axes were aligned with the gridding directions. FIG. 1 illustrates a cross section through the gridded version of the model. According to one aspect, $dx=dy=dz=⅛"$ was assigned.

Figure 3:
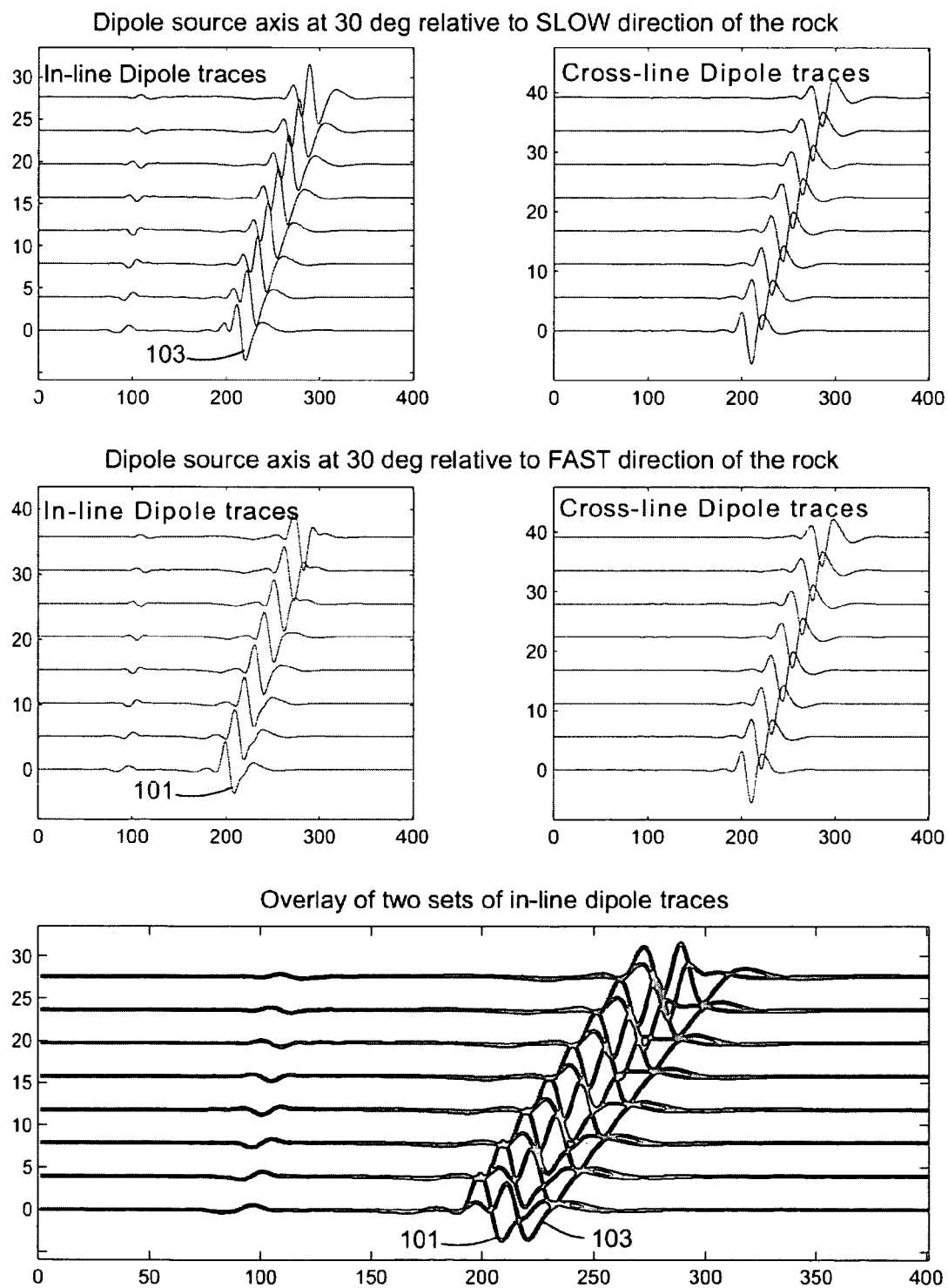
FIG. 3 shows the dipole fields extracted from the two orthogonal dipole stimulations in the Austin Chalk formation.

FIG. 3 illustrates the dipole fields extracted from the two orthogonal dipole simulations in the Austin Chalk rock. The top row shows the in-line dipole on the left, and the cross-line dipole on the right, for a first dipole run as the waves propagate along the borehole and are recorded by axially distributed receivers. The axis of the dipole source was oriented at 30° with respect to the TI (slow) axis of the rock. (In these plots as well as all other subsequent recorded waveform plots the horizontal axis represents a time index assuming 10 μsec sampling interval; the vertical axis represents pressure in Pa, and the receiver traces have been plotted at different offsets according to the receiver axial location along the tool for ease of visualization). The early, weaker arrival on the in-line traces is the flexural mode of the drill collar. The second arrival, which is appreciably stronger than the first early arrival, represents the borehole flexural mode. There is appreciable cross-line energy, primarily coming from the borehole (in fact there is negligible cross-line coming from the collar vibration in this case).

The middle row of FIG. 3 shows the corresponding in-line and cross-line dipoles for a second run. For the second run, the axis of the dipole source was oriented at 30° with respect to the fast direction of the rock. Similar comments related to the observed fields of the first run also apply to the second run.

The bottom panel of FIG. 3 is an overlay of the two sets of in-line dipole fields. One can observe the isotropic behavior of the early collar mode. The borehole mode, however, arrives earlier in time when the source is closer to the fast rock direction (traces 101, as opposed to the slow direction traces 103). This feature (borehole modes arriving earlier when the source is closer to the fast rock direction) can be used to discriminate between the fast and slow directions of the rock. This is done by cross-correlating the two signals and finding the time shift/delay at which the cross-correlation is maximal.

In one aspect, the Alford rotation technique is applied to the four sets of dipole traces from the Austin Chalk simulations in FIG. 3. The technique is described in detail in below and by Alford. Id. The fundamental concept of Alford rotation teaches that when a borehole is drilled perpendicular to the TI axis of the rock, because of the symmetries of the system, the in-line and cross-line dipole fields corresponding to the firing of two orthogonal dipole sources rotate following a second order tensor law. This is given by the equation:

$$\begin{bmatrix} P_{11} & P_{12} \\ P_{21} & P_{22} \end{bmatrix}_R = \begin{bmatrix} \cos\alpha & \sin\alpha \\ -\sin\alpha & \cos\alpha \end{bmatrix} \begin{bmatrix} P_{11} & P_{12} \\ P_{21} & P_{22} \end{bmatrix} \begin{bmatrix} \cos\alpha & -\sin\alpha \\ \sin\alpha & \cos\alpha \end{bmatrix}$$

Where:

$P_{11}$, $P_{12}$ represent the in-line and cross-line dipole fields corresponding to one of the orthogonal dipole source firings (e.g. first source 108—as opposed to orthogonal second source 110 (FIG. 1)), and $P_{22}$, $P_{21}$ represent the in-line and cross-line dipole fields corresponding to the second dipole source firing.

$\alpha$ is the rotation angle (i.e., the angle by which the two orthogonal sources are to be rotated and new sets of in-line and cross-line fields to be recorded).

The quantities inside the matrix with the $[\ ]_R$ subscript represent the four rotated fields.

Figure 4:
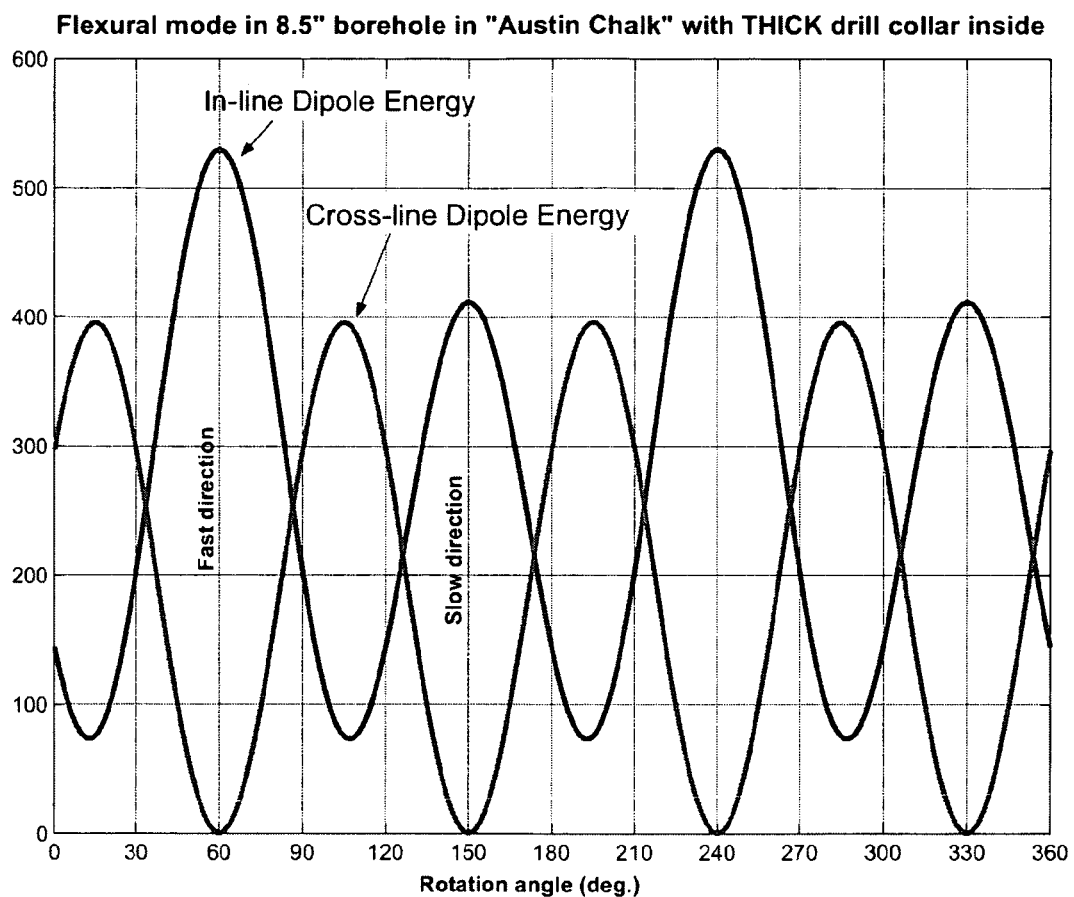
FIG. 4 shows the total in-line and cross-line energy change for a first dipole source as a counter-clockwise rotation is performed.

Under ideal conditions $P_{12}$ is equal to $P_{21}$, and we are interested in finding the rotation angle $\alpha$ that yields null $[P_{12}, P_{21}]_R$. $[P_{12}, P_{21}]_R$ is null when performed on the simulated results presented in FIG. 3. In fact, FIG. 4 shows how the total in-line and cross-line energy change for the first source 108 (FIG. 1) as a counter-clockwise rotation was performed. The cross-line energy goes to zero at 60° with respect to the original orientation of the sources. That is, when the first source 108 (FIG. 1) is pointing perpendicular to the TI axis of the rock. The corresponding in-line energy is of course maximal there. At 150° rotation, the first source 108 (FIG. 1) is aligned with the TI axis and again the cross-line energy experiences a null while the inline energy is maximal. This tells us that the principal (fast/slow) directions of the rock are at 60° and 150° counterclockwise from the original orientation of the first source 108.

In general, however, "noise" introduced by non-ideal conditions (e.g., non-perfect dipole sources, non-perfectly matched azimuthal sensors, tool eccentricity in the borehole, etc.) into the recorded cross-line dipole traces $P_{12}$ and $P_{21}$ will not be identical, and the rotation will not show directions where the cross-line energy is zero. Instead one may find the rotation angle $\alpha$ that yields a minimal sum of the cross-line energy from the two orthogonal dipole firings. The minimal sum is given by the expression:

$$E = \mathop{\text{Min}}_\alpha \sum_{i=1}^{n} [(P_{22}(t_i) - P_{11}(t_i))\sin(2\alpha) + (P_{12}(t_i) - P_{21}(t_i))\cos(2\alpha)]^2$$

Where $t_i$ represents a finite set of time indexes, and $P(t_i)$ represents the value of a particular dipole field at a given time index.

It is no surprise that for the example shown in FIG. 3, the values of α that minimize that cross-line energy are given by, [60°+m (90°)], with m being an arbitrary integer.

Figure 5:
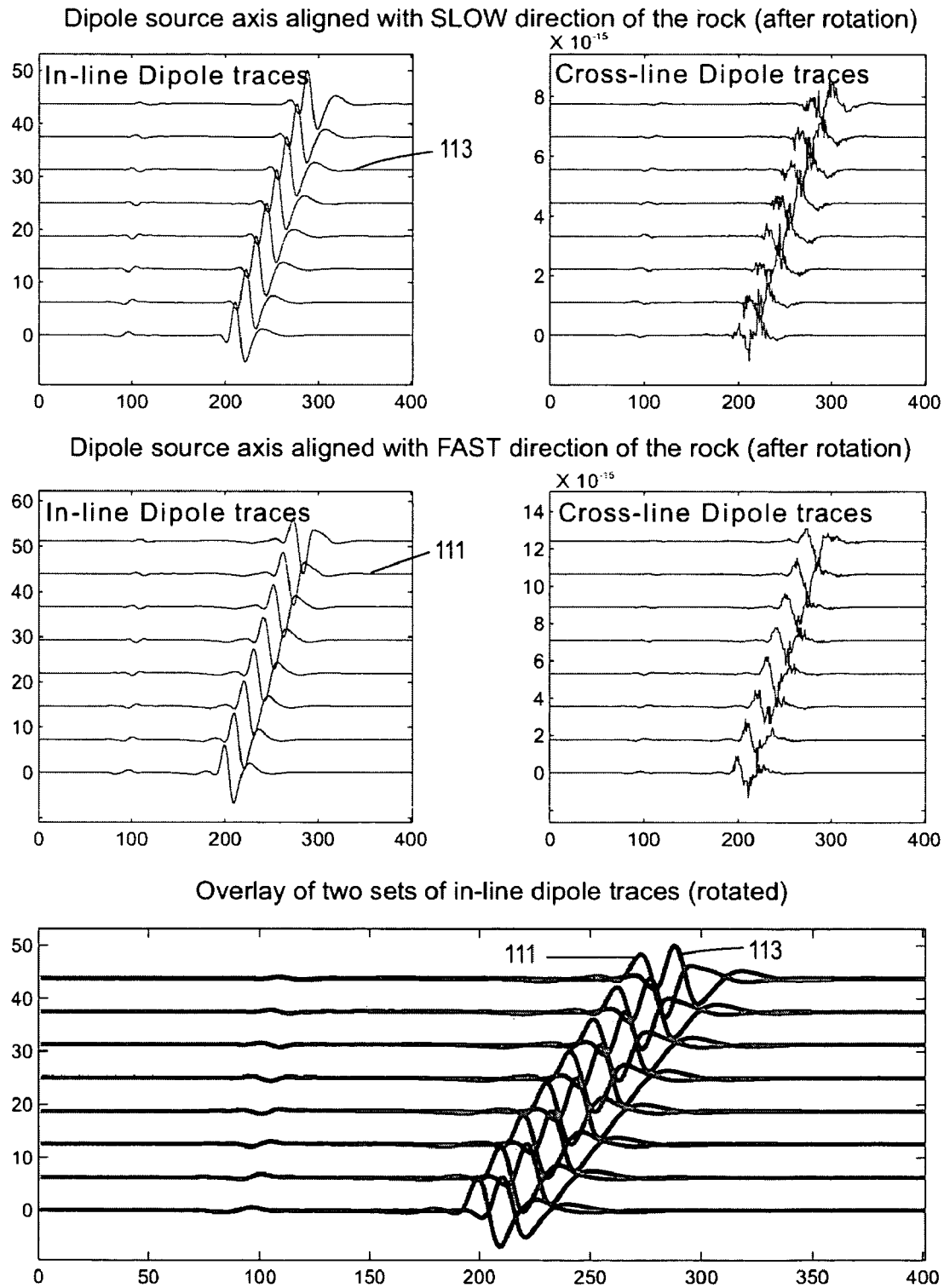
FIG. 5 shows a set of in-line and cross-line dipole traces obtained after rotating the original fields in FIG. 2 by 60 degrees.

FIG. 5 illustrates a set of in-line and cross-line dipole traces obtained after rotating the original fields of FIG. 3 by 60°. The cross-line dipole fields are not identically zero essentially because of the finite precision arithmetic (the vertical axis on the traces, which is set by the peak amplitude, shows that the amplitude of the cross-line fields is more than 15 orders of magnitude smaller than the in-line fields). Once again, the bottom panel in the figure shows an overlay of the two sets of in-line dipole fields corresponding to the two orthogonal sources. The difference in arrival time is clearly observed.

Figure 6:
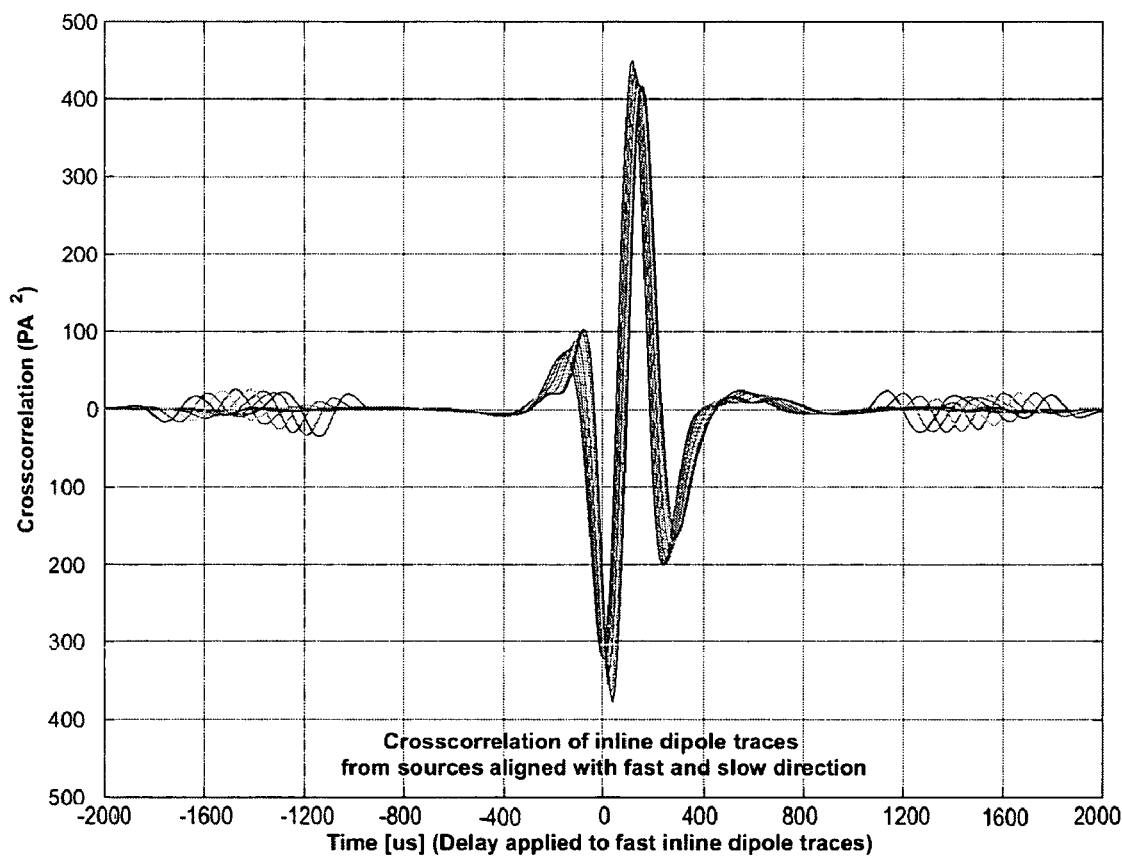
FIG. 6 illustrates the result of cross-correlating the two sets of rotated in-line dipole traces shown in the bottom panel of FIG. 4.
Figure 7:
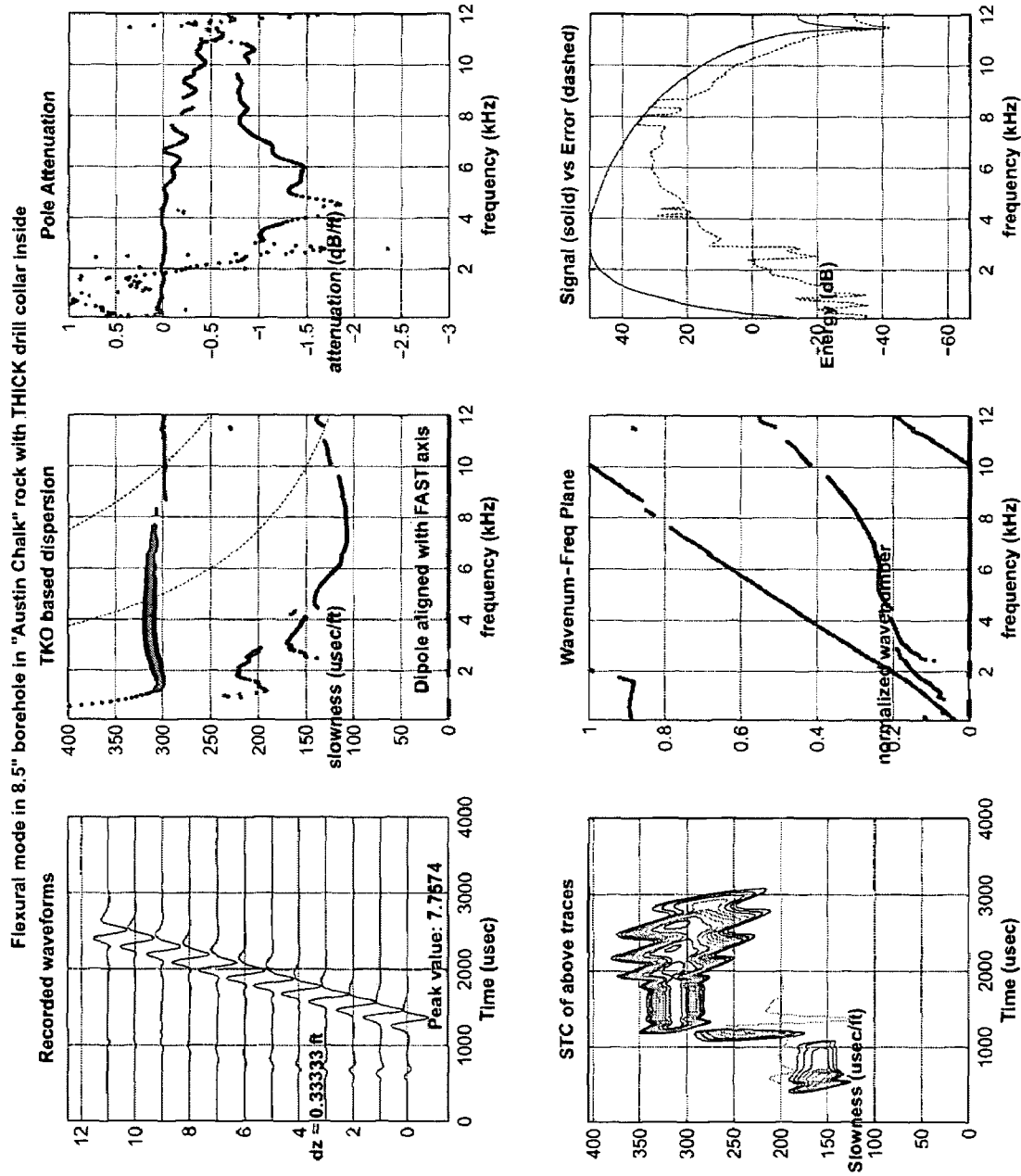
FIGS. 7-8 illustrate further processing on the rotated in-line dipole traces that can be used to identify fast shear direction.
Figure 8:
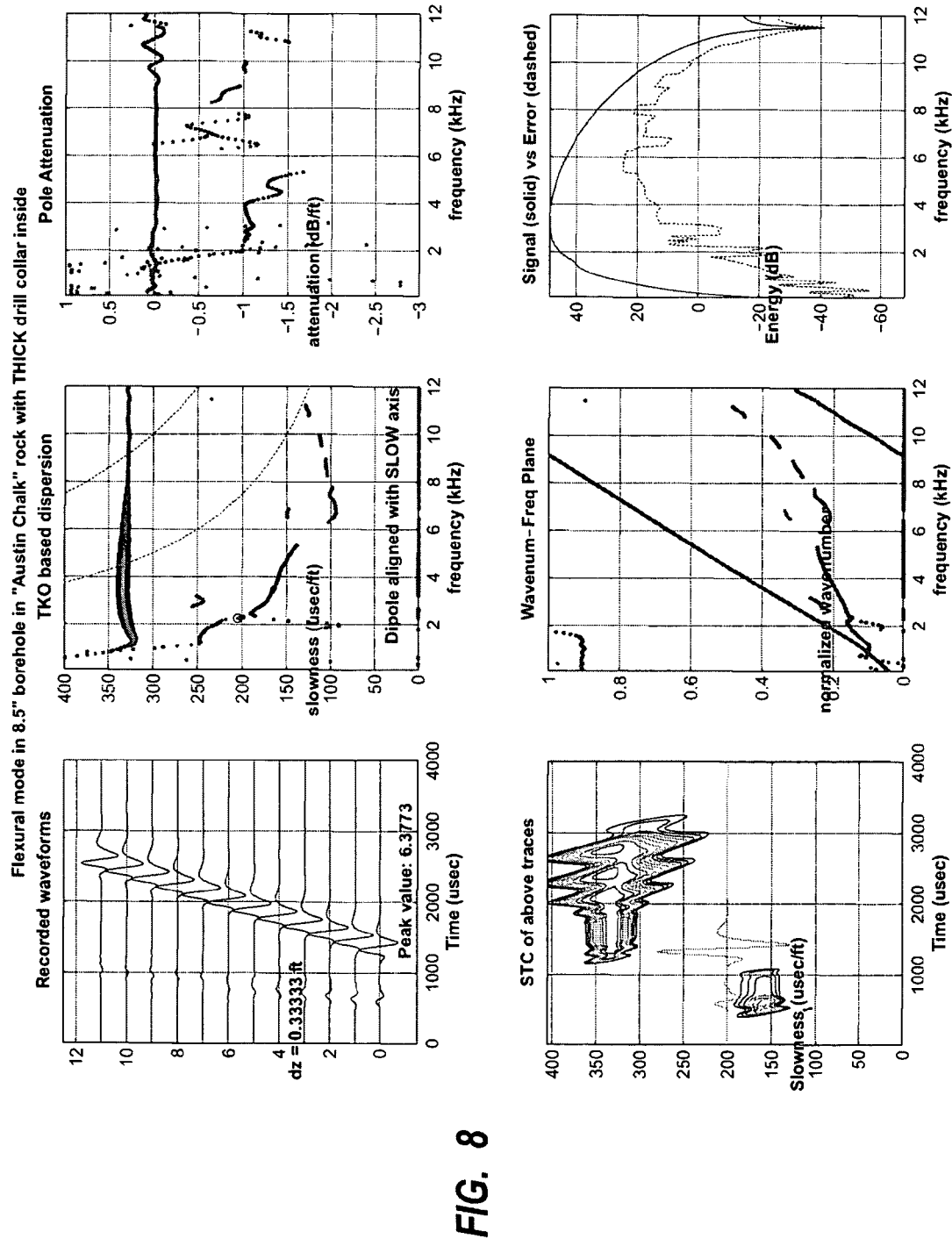

FIG. 6 provides the result of cross-correlating the two sets of rotated in-line dipole traces shown in the bottom panel of FIG. 5. FIG. 6 shows that a maximal cross-correlation is achieved with a delay of ~140 μsec applied to the traces 111 (FIG. 5). The maximal cross-correlation is an indication that the traces 111 (FIG. 5) correspond to the principal fast shear direction of the rock. FIGS. 7 and 8 further illustrate processing of the rotated in-line dipole traces that can also be used to identify the fast rock direction.

FIG. 7 illustrates in the top-left panel the rotated in-line traces corresponding to the source aligned with the principal fast shear direction. In the bottom left panel, a Slowness-Time Coherence plane (STC) is plotted. See, e.g., Kimball, C. V. and Marzetta, T. L., "Semblance Processing of Borehole Acoustic Array Data," GEOPHYSICS, Vol. 49, No. 3, pp. 274-281. The strongest coherence peak corresponds to the borehole flexural arrival with a slowness of ~315 μsec/ft across the array of receivers. There are two more weak coherence peaks, one at ~160 μsec/ft which is the collar arrival; and a very faint peak at ~250 μsec/ft, which in this case matches relatively well with the fast shear slowness of the rock. The top-center panel of FIG. 7 shows a computed dispersion (slowness vs. frequency) analysis of the rotated in-line traces. The top-center panel of FIG. 7 shows a very well defined borehole flexural mode with a slowness in the 300-315 μsec/ft range between 1-8 kHz; and a weaker and much more dispersive collar mode with slowness between 100-220 μsec/ft. It is important to notice that the TKO result does not show anything near the 257 μsec/ft slowness which is the actual fast shear slowness of the rock. Although anisotropy can be detected, the actual shear slowness value is not given. TKO processing is known to those of skill in the art having the benefit of this disclosure. See Lang, S. W., Kurkjian, A. L., McCellan, J. H., Morris, C. F., and T. W. Parks, "Estimating slowness dispersion from borehole sonic waveforms," GEOPHYSICS Vol. 52, No. 4, pp. 530-544 (1987). See also Ekstrom, Michael P., "Dispersion estimation from borehole acoustic arrays using a modified matrix pencil algorithm," PROCEEDINGS OF THE 29TH ASILOMAR CONFERENCE ON SIGNALS, SYSTEMS, AND COMPUTERS, Pacific Grove, Calif., 1995. The rest of the panels in FIG. 7 are referenced below.

FIG. 8 shows the corresponding STC and TKO processing when applied to the rotated in-line traces when the source is aligned with the principal slow shear direction of the rock. The STC plane of the left-bottom panel of FIG. 8 shows the maximal coherence of the borehole arrival around ~335 μsec/ft; and the TKO plane of the top-center panel of FIG. 8 shows a borehole mode in the 325-340 μsec/ft range. Thus, it is clear from these results that both STC and TKO processing can be used to discriminate between the fast and slow directions of the rock in addition to the cross-correlation technique. Some aspects thus use STC and TKO processing to determine the fast and slow principal shear directions, and some aspects use cross-correlation as discussed above.

Figure 9:
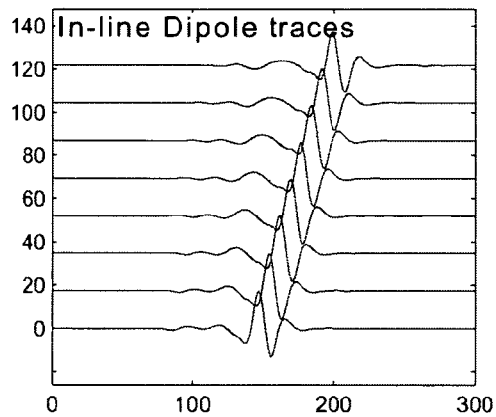
FIGS. 9-14 show results corresponding to a Bakken Shale study as opposed to an Austin Chalk formation shown in FIGS. 2-6.
Figure 9:
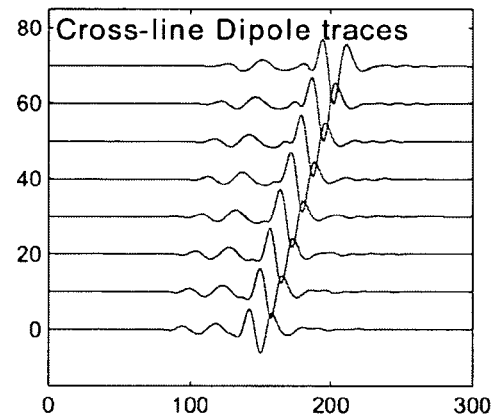
Figure 9:
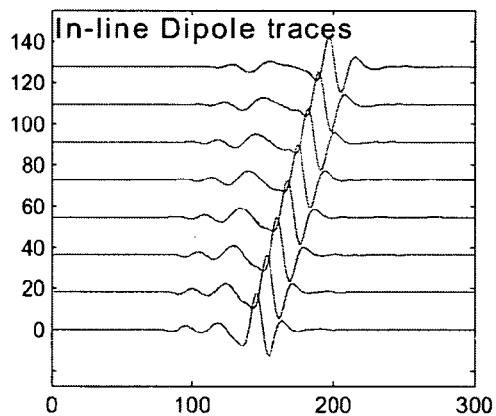
Figure 9:
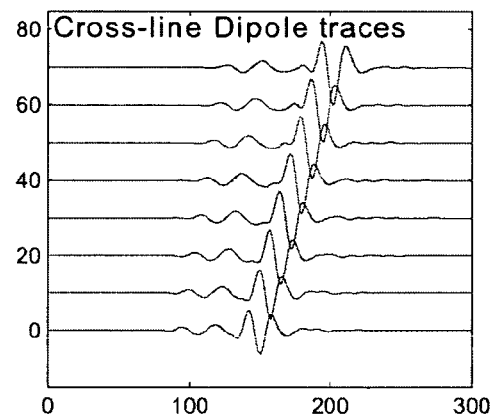
Figure 9:
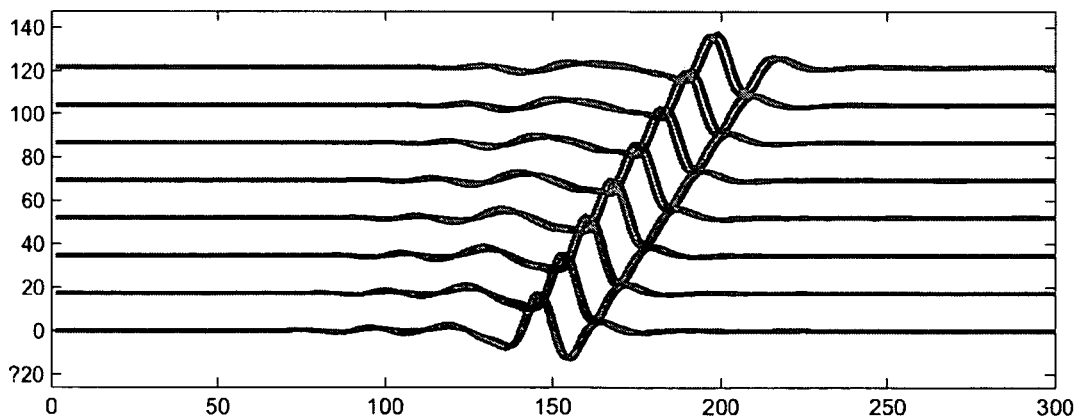
Figure 10:
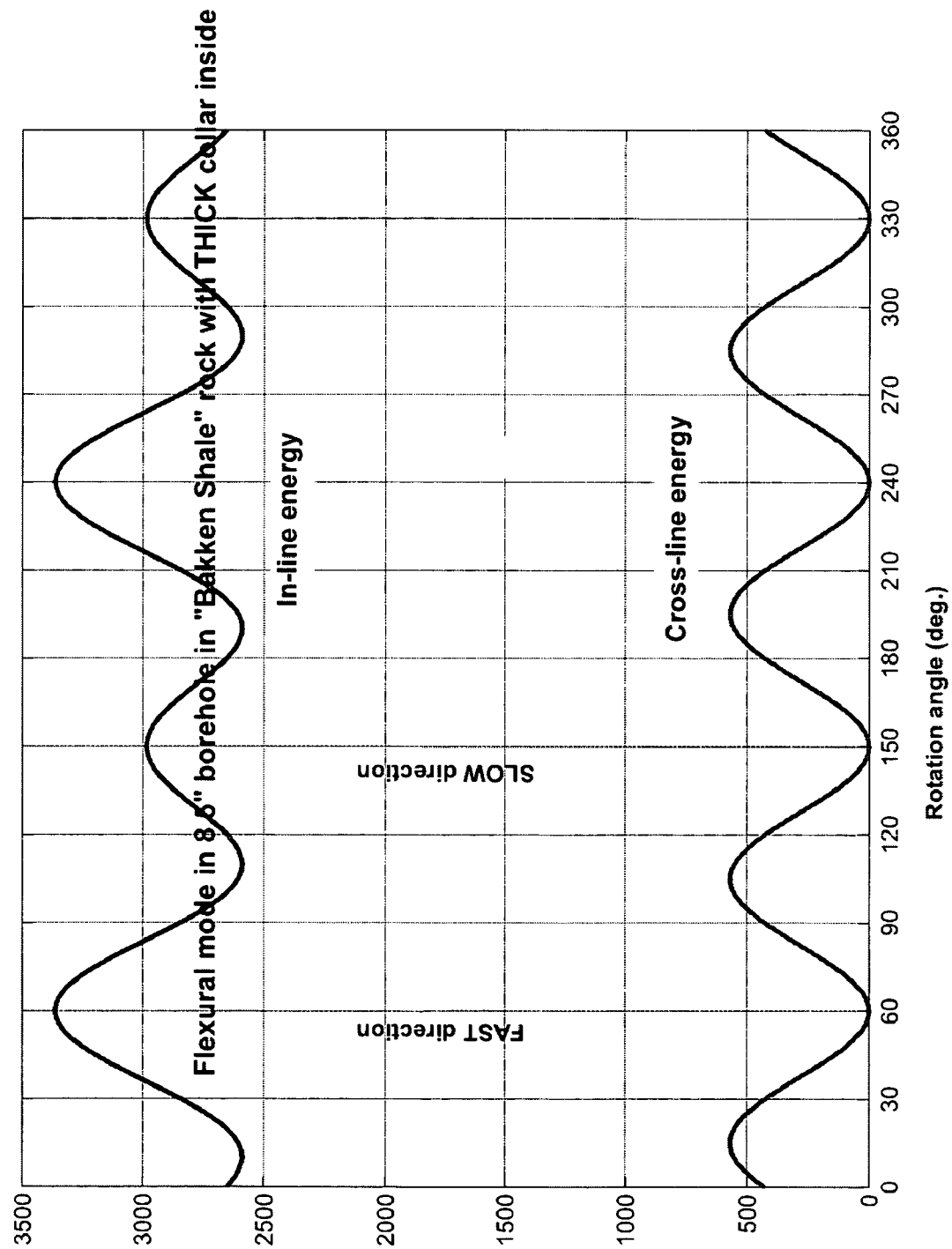
Figure 11:
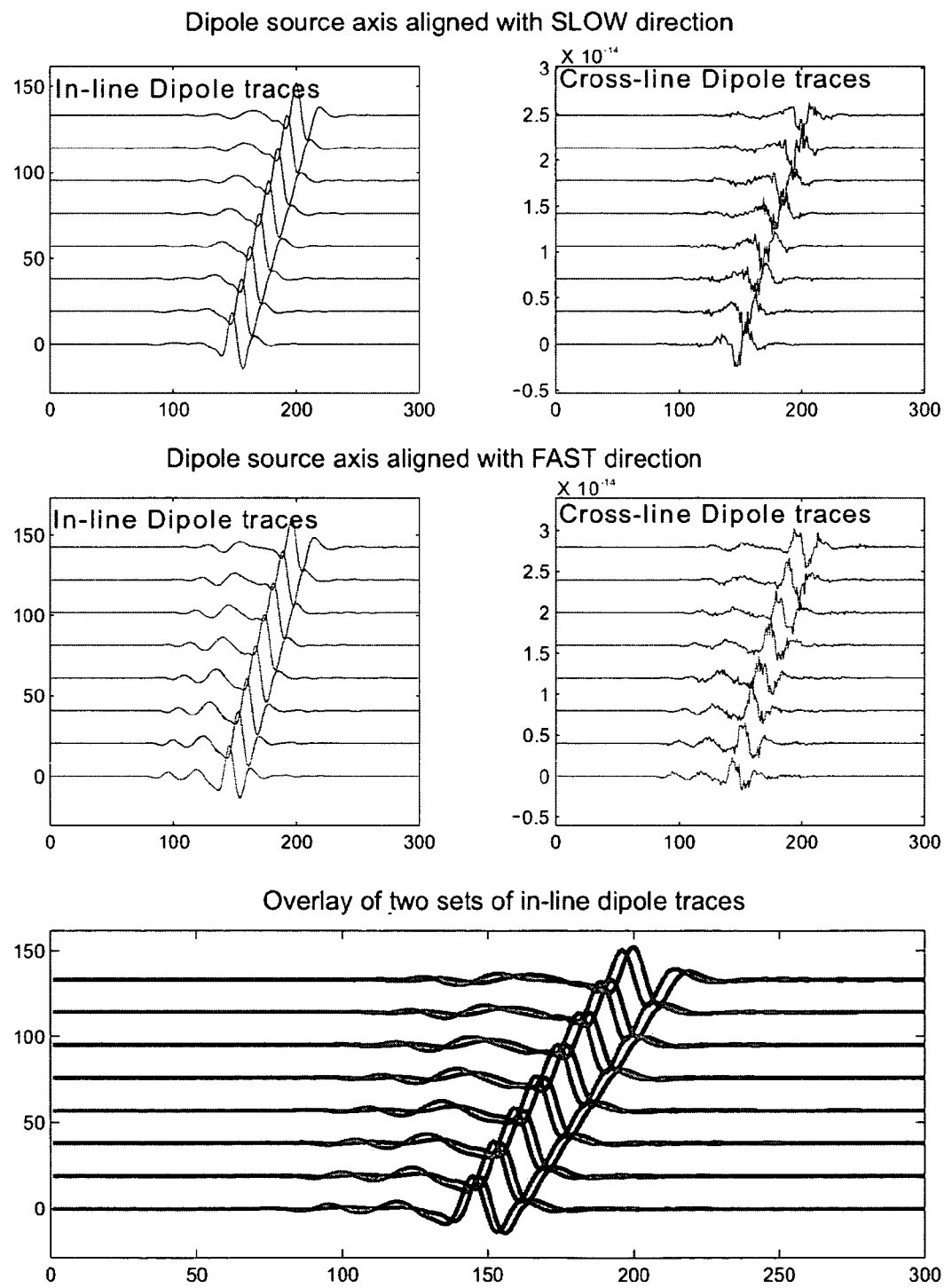
Figure 12:
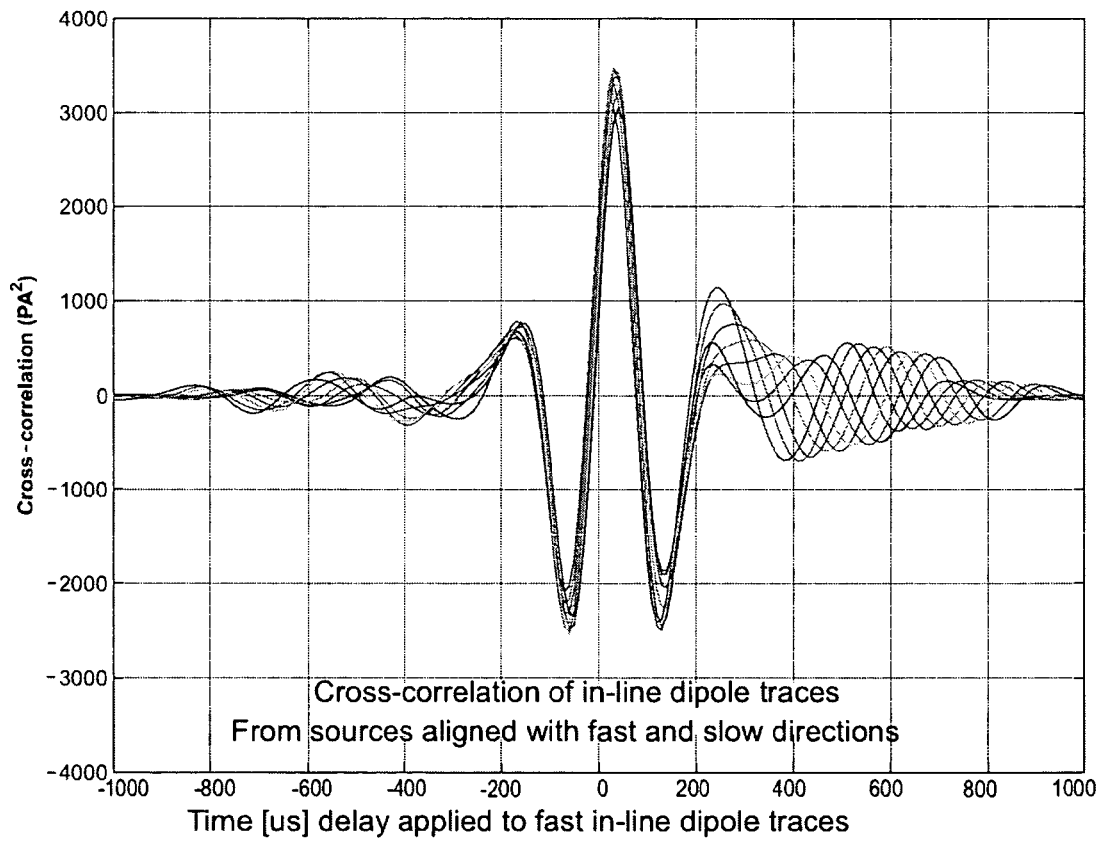
Figure 13:
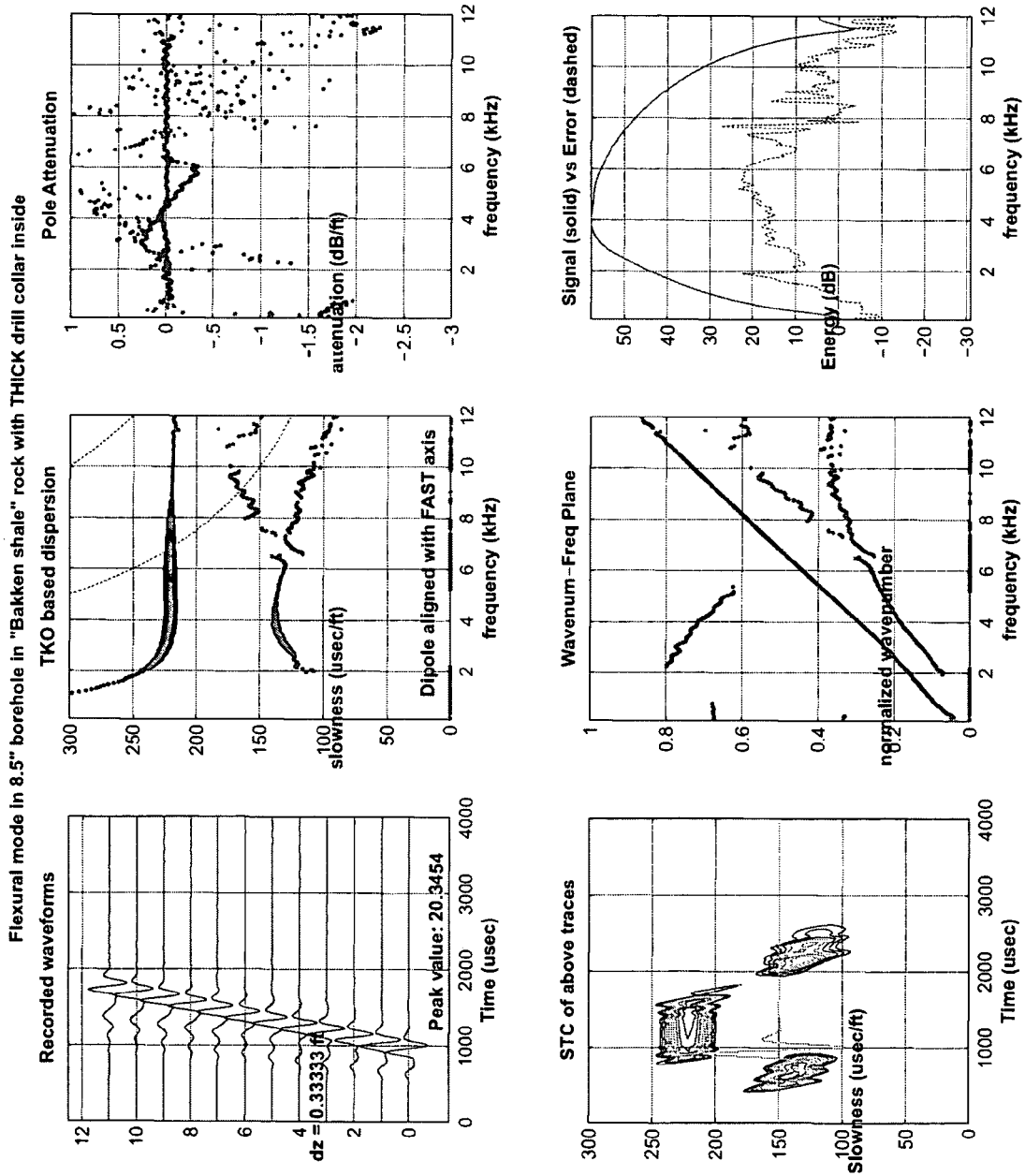
Figure 14:
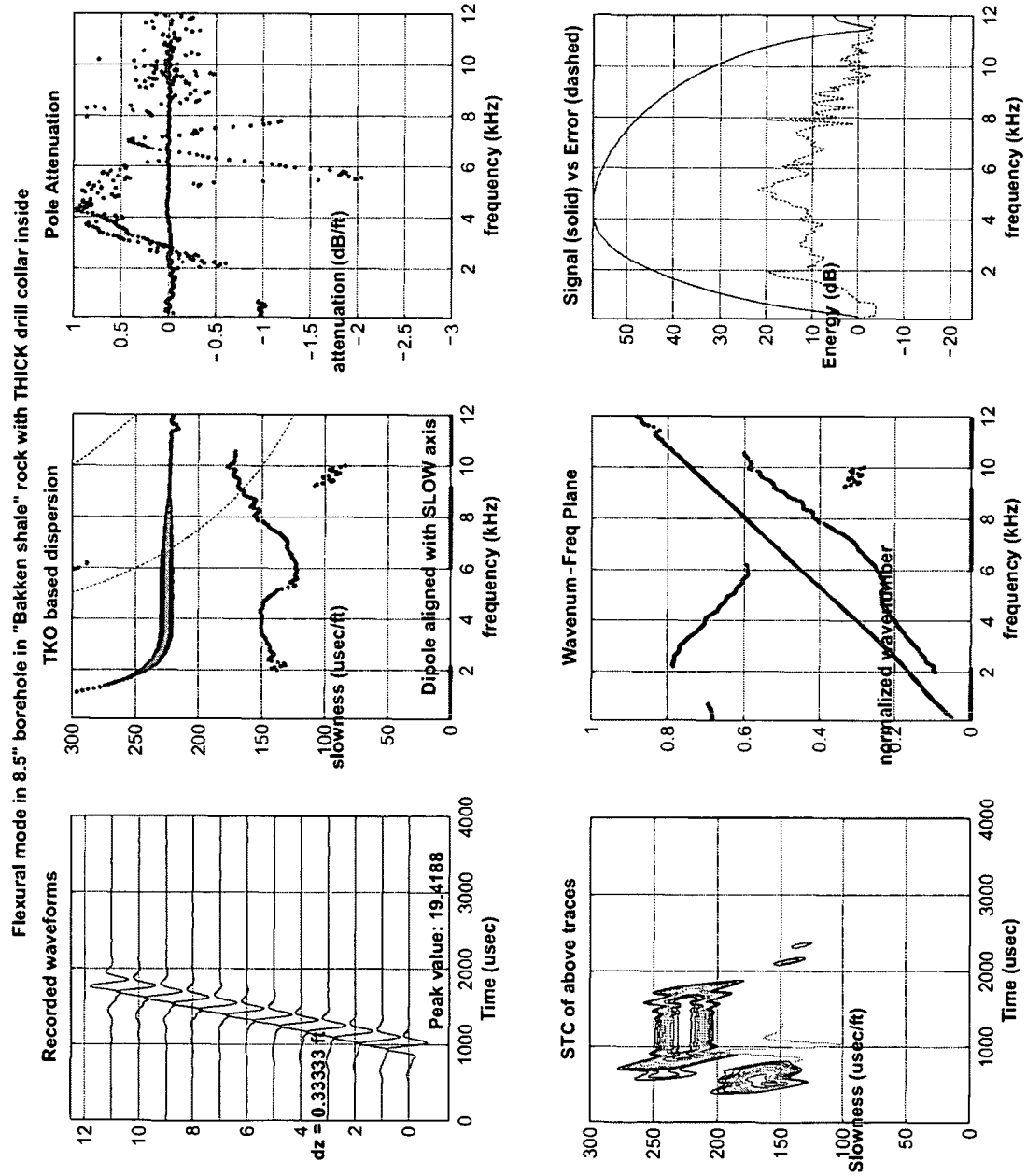
Figure 15:
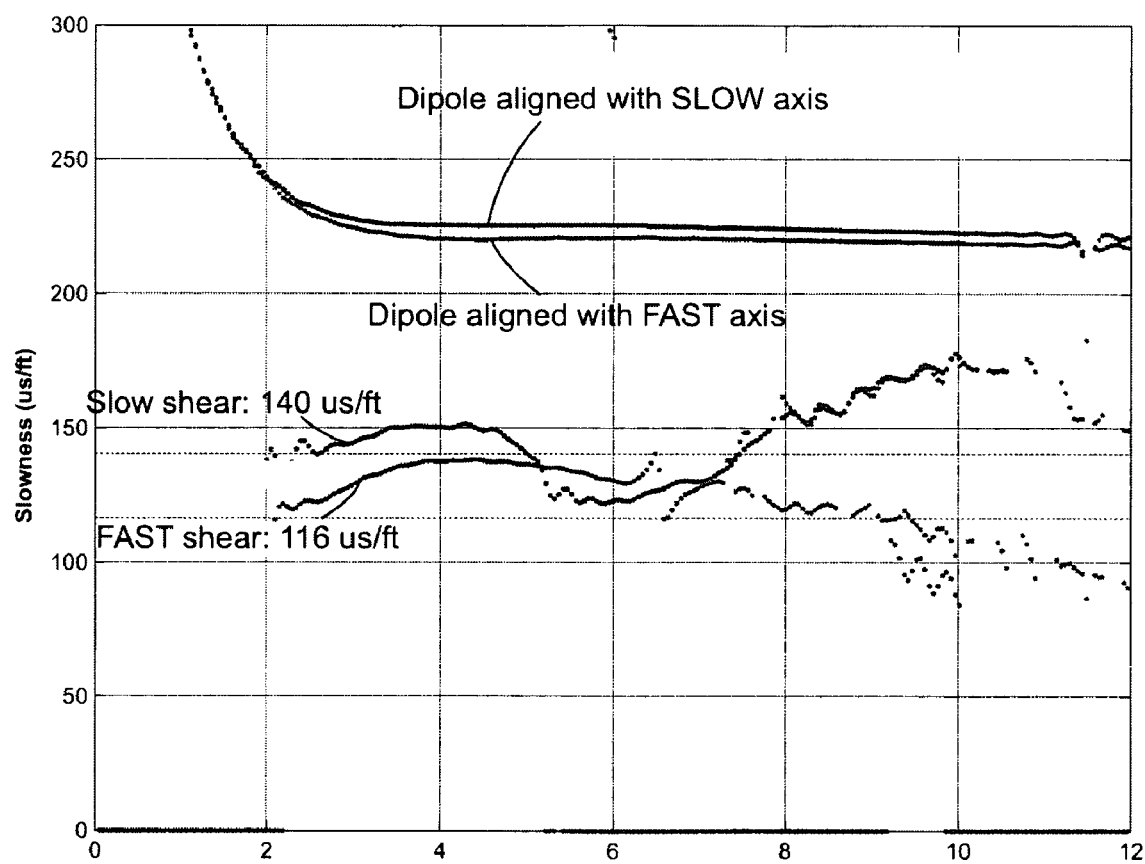
FIG. 15 shows two modes present illustrating the fast and slow shear directions.
Figure 16:
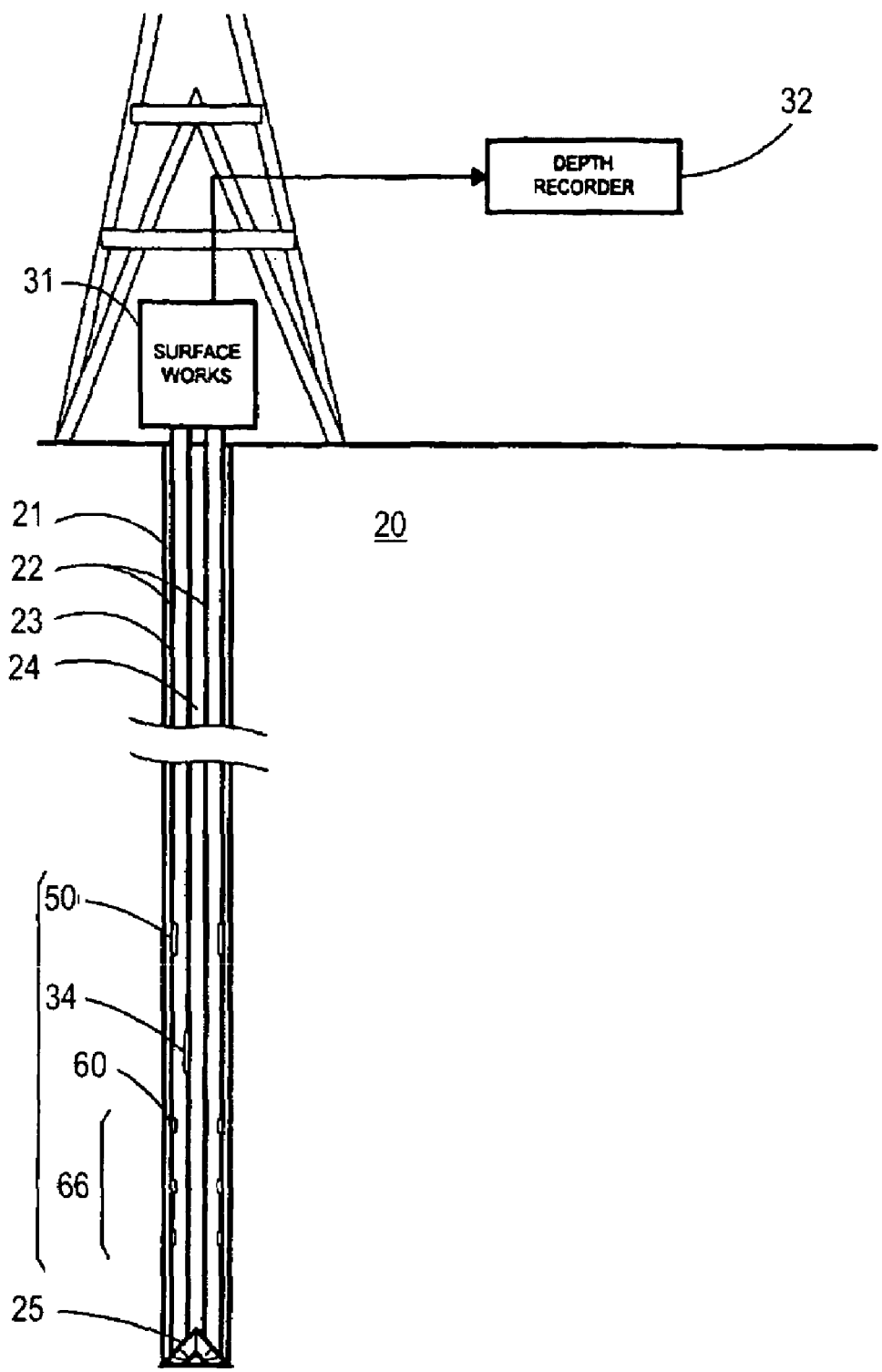
FIG. 16 is a schematic elevation view of a first embodiment with an LWD monopole/dipole/quadrupole acoustic logging tool located in a drill string in a borehole.

FIGS. 9-14 illustrate results corresponding to a Bakken Shale case study. A few differences with respect to the previous case of FIGS. 3-8 may be important to note. The differences are essentially due to faster wave propagation speeds through Bakken Shale as compared to Austin Chalk. First, as seen in FIG. 9, there is a stronger tool-rock interaction in the harder rock case. Second, comparing FIG. 10 with FIG. 4, it is clear that the ratio of cross-line to in-line dipole energy is much smaller in the faster rock case (about a 1:6 ratio in peak energies) than in the slower rock (where the ratio closer to 1:1), although in both cases, the cross-line dipole energy goes to zero (or a minimum) at the 60° rotation angle (which is when the two orthogonal sources are aligned with the rock's principal shear directions). Third, the cross-correlation of the sets of in-line dipole traces aligned with the fast/slow directions of the rock (FIGS. 11 and 12), show a smaller time differential, 30-40 μsec, between the two arrivals. It is also clear that there are smaller differences observed between the coherence peaks in the STC planes, and between the dispersion of the modes in the TKO slowness vs. frequency planes in FIGS. 13-14 as compared to FIGS. 5-6. In addition, an overlay of the TKO planes from the fast and slow directions, as shown in FIG. 15 reveals that the two modes present are so tightly coupled that there are observable changes in both.

Accordingly, in spite of the modal interference encountered due to a mechanically strong collar of an LWD apparatus, using a pair of orthogonal dipole sources and recording the in-line and cross-line dipole fields along the borehole (with appropriately oriented arrays of sensors) can be used (through appropriate processing) to give an indication of the principal fast and slow azimuthal directions when a borehole is being drilled through anisotropic rock. The principal shear directions can be found while drilling even in fast rock conditions where the interaction of borehole and drill collar modes might be appreciable (as shown in the Bakken Shale simulated experiment). The two orthogonal dipole sources may physically be present in the tool according to some embodiments, or could be obtained from subsequent firings of a single physical source as the collar rotates during the drilling operation.

One embodiment of a logging system 100 is shown in FIGS. 16-19C that may be used according to embodiments of the invention. A subsurface formation 20 is traversed by a borehole 21 enclosing a drill string 22. During drilling of the formation 20, the borehole 21 is immersed in drilling mud. In one embodiment, the drill string 22 defines a string outer surface 23 and a mud channel 24. In one embodiment an LWD tool 30 includes electro-acoustic transmitter 50 that may be capable of exciting monopole or multi-pole wave modes, including, but not limited to, dipole, dipole in two orthogonal directions, and quadrupole wave modes. The LWD tool 30 may also include an electro-acoustic receiver 60 capable of measuring received acoustic signals in at least four orthogonal directions. The LWD tool may also include receiver electronics 34.

The LWD tool 30 is operatively connected to surface equipment 31. The surface equipment 31 may include drill string support and drive mechanisms (not specifically shown) and other apparatus. Batteries or a mud motor (not shown) contained by the LWD tool 30 provide electrical power to the transmitter 50 and the receiver electronics 34. The drill string 22 may provide depth data to a depth recorder 32. In one embodiment, the depth recorder 32 and receiver electronics 34 each include a clock, and both depth and signal data are recorded as functions of time. A dispersive slowness time coherence processor 40 may perform dispersive slowness time coherence processing on digital data from the LWD tool 30 and uses recorded time data to associate depth data with signal data.

Figure 17:
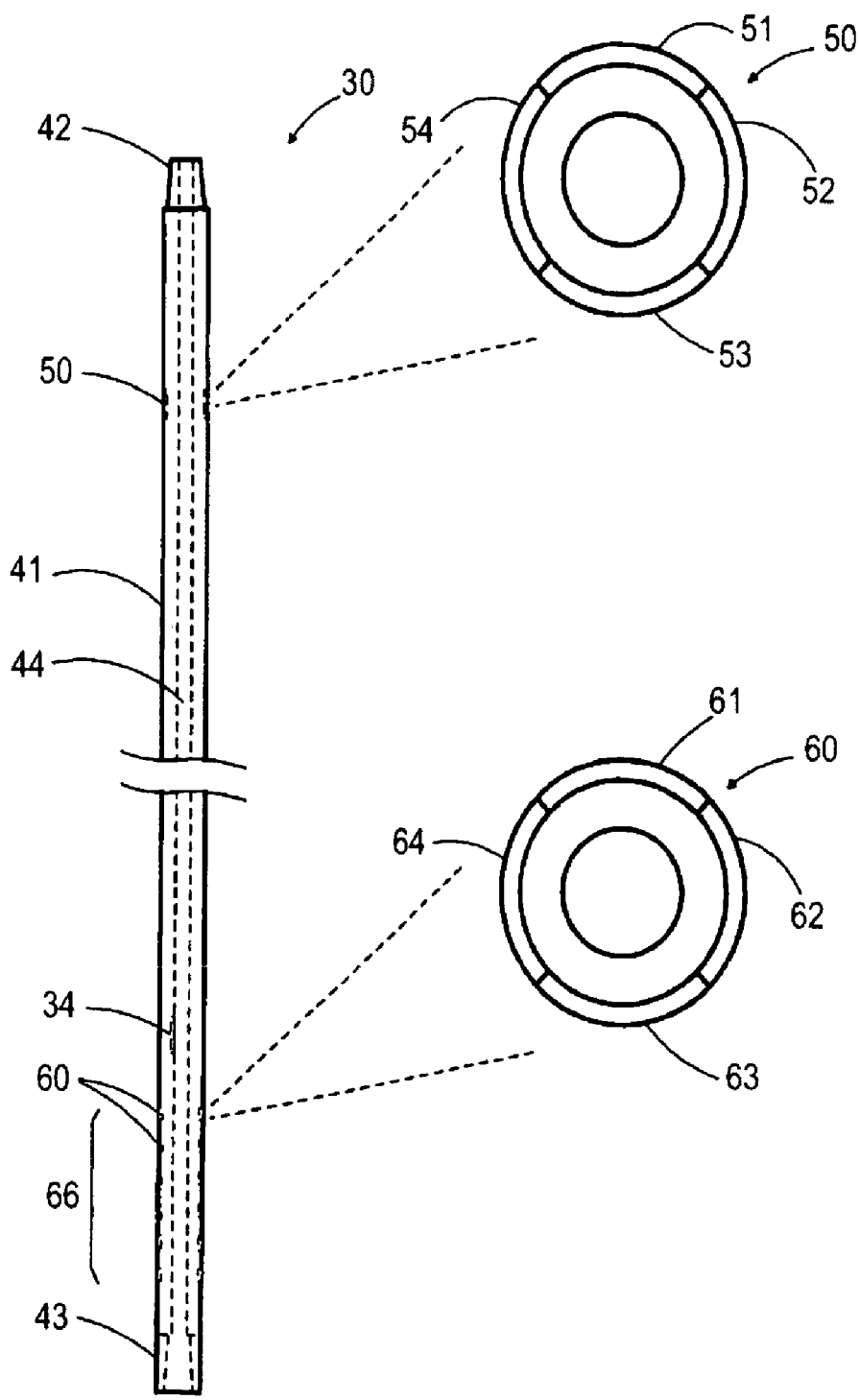
FIG. 17 is an enlarged elevation view of the tool of FIG. 15 showing selected interior components including a monopole/dipole/quadrupole transmitter, a receiver array, and receiver electronics.

FIG. 17 illustrates selected components of the LWD tool 30 schematically according to one embodiment. The drill string 22 of FIG. 16 includes a plurality of drill collars. The LWD tool 30 (FIG. 16) may comprise the same general shape as one or more of the drill collars, including a pipe portion 41, a male threaded end 42 and a female threaded end 43. The pipe portion 41 defines a mud channel 44. Similar to a drill collar, one embodiment of the LWD tool 30 may comprise approximately 9 meters (30 feet) in length and approximately 10-20 cm (4 to 8 inches) in outside diameter. Referring again to FIG. 16, multiple collars and the LWD tool 30 may be connected to form the drill string 22. The LWD tool 30 is connected within the drill string 22 above a drill bit 25.

FIG. 17 illustrates one embodiment of the LWD tool 30 wherein the transmitter 50 is capable of at least monopole, dipole, dipole in two orthogonal directions, and quadrupole firings. As mentioned above, the LWD tool also includes the receiver 60. The transmitter 50 and the receiver 60 may be embedded in circumferential grooves disposed in an outer surface 43 of the LWD tool. According to one embodiment, the transmitter 50 comprises a piezoelectric ring transmitter or transducer divided into four quadrants 51-54 as shown in FIG. 17. The transmitter 50 may comprise two halves, four quadrants, or any other number of pieces. The four quadrants 51-54 or other number of pieces may be inserted in a circumferential groove of the drill collar. The quadrants 51-54 may be embedded in epoxy or similar material to hold them in place and to provide mechanical protection against harsh drilling environments.

Figure 18:
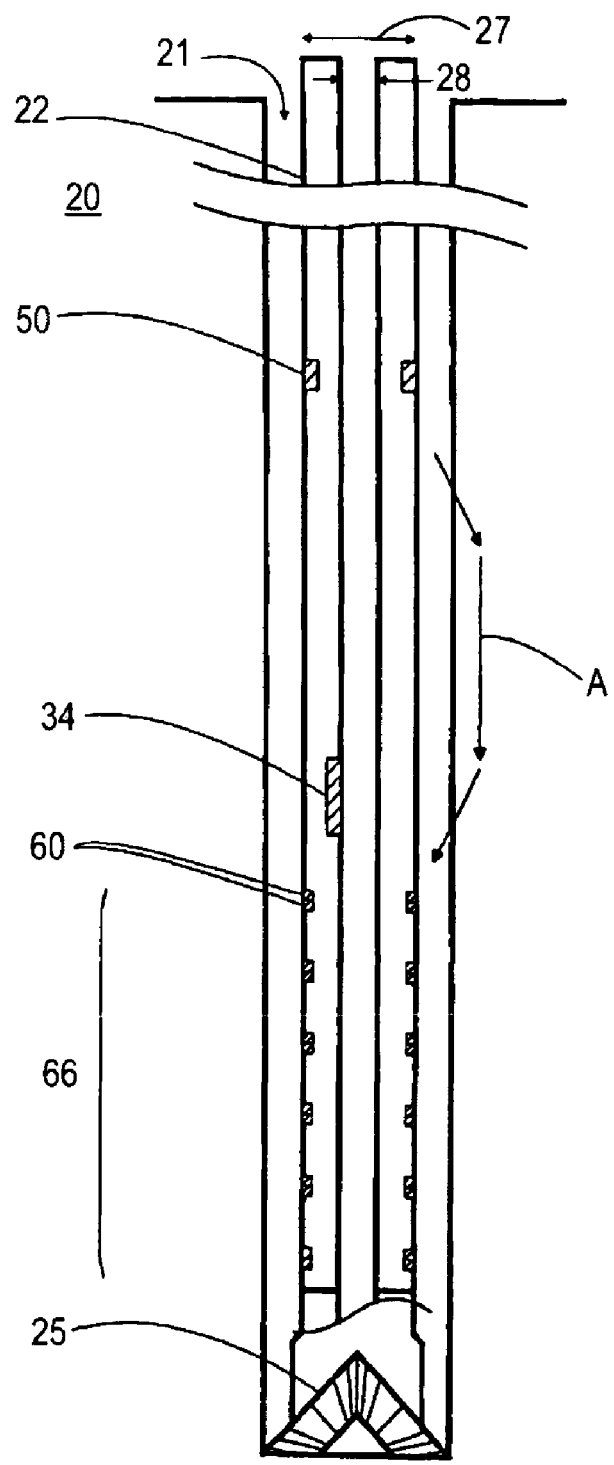
FIG. 18 is an enlarged schematic cross section view of the tool of FIG. 15 in the borehole and attached to a drill bit.
Figure 19A:
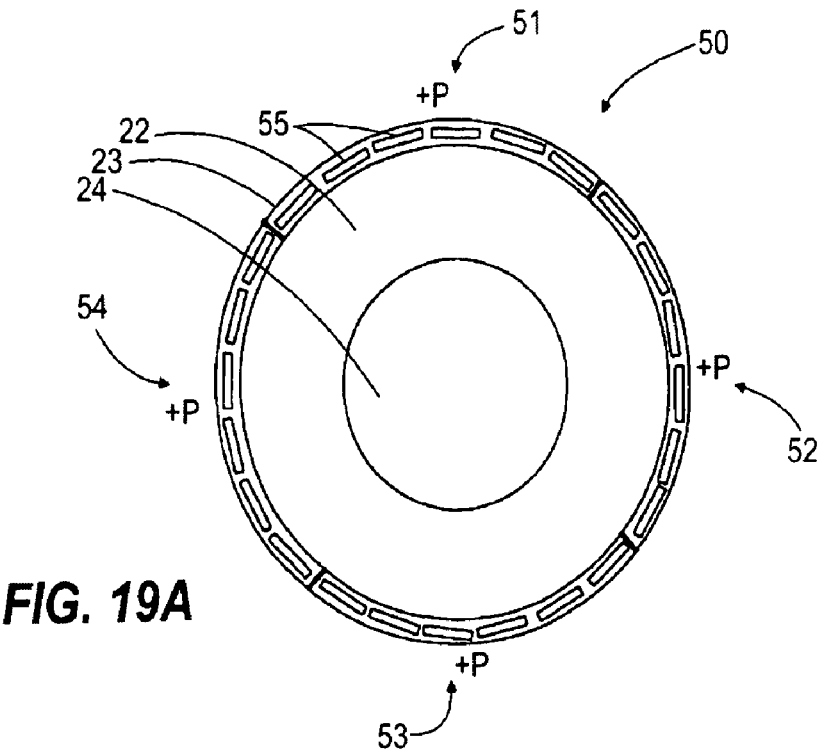
FIG. 19A is a schematic axial view of a transducer/transmitter made up of a ring of piezoelectric elements grouped into quadrants, the elements in a quadrant are electrically connected and fire together, however the firing of each quadrant can be independently controlled. In this case all quadrants fire in phase to generate a monopole mode of excitation.

As mentioned above, according to one embodiment, the transmitter 50 comprises a ring transmitter or transducer. FIGS. 18 and 19A illustrates multiple piezoelectric elements arranged in the ring. For example, six, nine or any other number of piezoelectric elements may be disposed in each quadrant or other divided portion of the ring. In one embodiment including nine piezoelectric elements per quadrant, a total of 36 piezoelectric elements is uniformly spaced around the azimuth to form the transmitter 50. Such an arrangement may provide a thin layer of piezoelectric elements (thereby requiring only a shallow groove), and utilizes the available space. Accordingly, acoustic power output may be maximized.

Figure 19B:
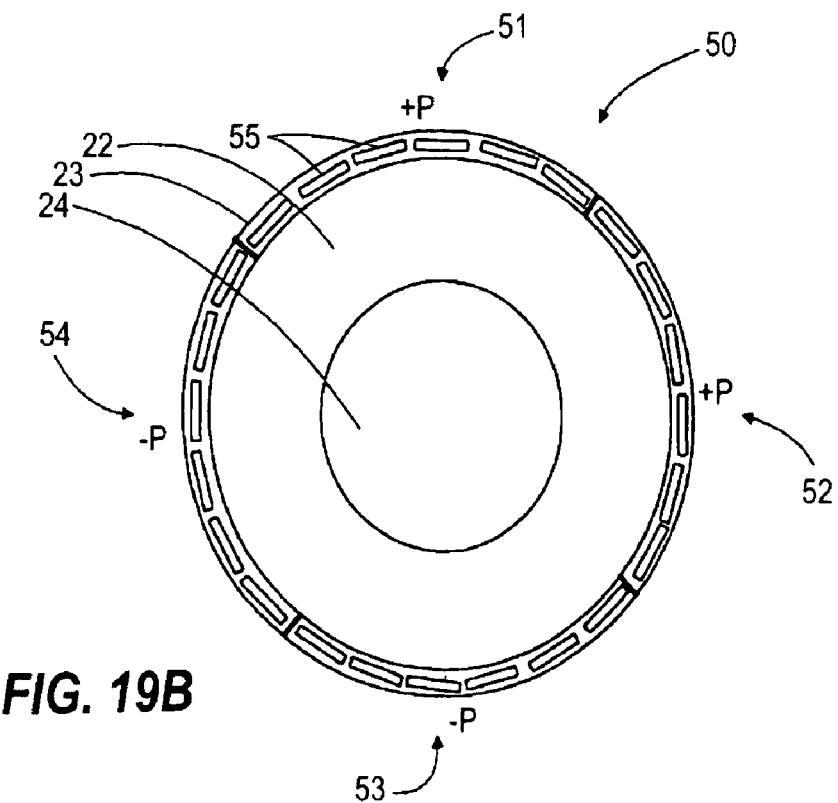
FIG. 19B is a schematic axial view of the transducer/transmitter of FIG. 19A wherein two diametrically opposed quadrants fire out of phase to generate a dipole mode of excitation.
Figure 19C:
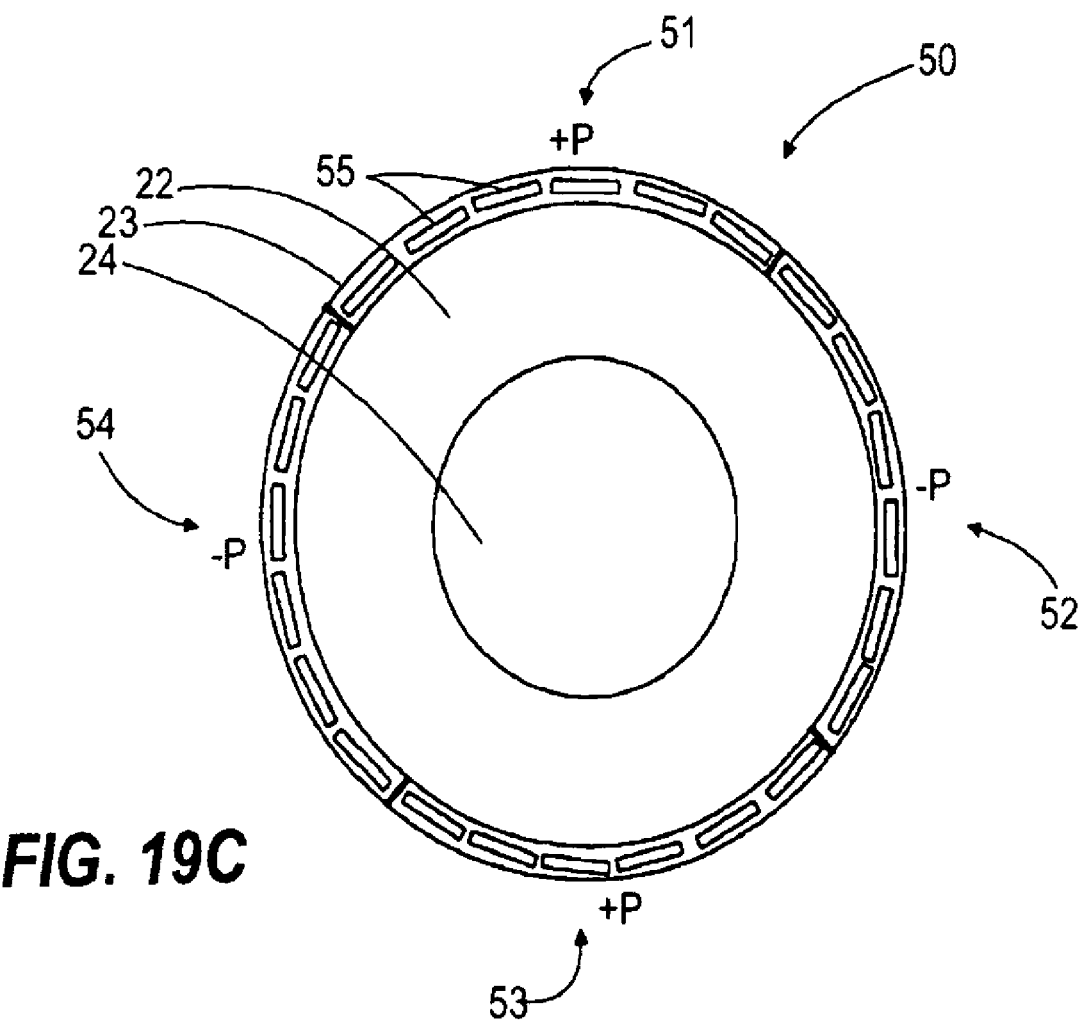
FIG. 19C is a schematic axial view of the transducer/transmitter of FIG. 19A wherein the quadrants are fired at the same time but in such a way that adjacent quadrants are out of phase to each other so as to generate a quadrupole mode of excitation.

According to some embodiments, the transmitter 50 can be fired by a controller in monopole, dipole, and quadrupole modes. The transmitter 50 may also be fired in dipole mode in two orthogonal directions according to some embodiments. To excite a monopole mode, all quadrants 51-54 comprise a positive polarity as shown in FIG. 19A. A dipole mode may be excited by causing opposite quadrants to fire according to opposite polarities as shown in FIG. 19B. A dipole mode may also be excited with only two opposing "quadrants" (e.g. 51 and 53) by firing the opposing quadrants 51 and 53 according to opposite polarities, rotating the LWD tool 90°, and firing the opposing quadrants 51 and 53 according to opposite polarities again. For example, quadrants 51 and 52 may fire according to a positive polarity, and quadrants 53 and 54 may fire according to a negative polarity. The dipole direction will be different when two opposed quadrants fire, than when four of them fire as described above. Adjacent quadrants 51-54 may be fired according to alternate polarity as shown in FIG. 19C to excite a quadrupole mode. The transmitter 50 transmits the acoustic wave through the formation as shown by arrows A in FIG. 18, i.e. substantially along the axis of the borehole and the axis of the transmitter.

Similar to the transmitter 50, the receiver 60 may be assembled from pieces (such as quadrants 61-64 in FIG. 17) and embedded in epoxy or similar material. The receiver 60 includes multiple sensors or hydrophones arranged azimuthally around the collar. In one embodiment, multiple axially-spaced receivers 60 form an array 66 at a plurality of stations. For example, in one embodiment, at least four receivers stations comprise the array 66. In one embodiment, at least eight or at least twelve receiver stations comprise the array 66. In one embodiment, each receiver 60 includes at least four sensors arranged orthogonally. According to some embodiments each receiver 60 includes at least eight equally spaced sensors. Therefore, the receiver 60 can detect waves in at least four orthogonal directions. Each receiver 60 may be electronically or mechanically configured for monopole, dipole, and/or quadrupole reception. In some embodiments using dipole mode, only four azimuthal sensors are necessary (two to measure in-line and two to measure cross-line). In addition, for embodiments measuring monopole/quadrupole interaction (discussed below), each receiver 60 may have only four sensors as long as the logging tool is fired in monopole mode multiple times while turning the tool, so as to record quadrupole mode data in multiple directions. In one embodiment, additional azimuthal sensors, for example at least eight, comprise each receiver 60. Embodiments of the receiver 60 containing at least eight azimuthal sensors facilitate single firing by the logging tool and compute quadrupole interactions in different directions. A combination of approaches is also possible as well as additional azimuthal receivers.

Conventional components of the LWD tool 30 may include power supplies, transmitter electronics, receiver electronics, and telemetry.

It will be understood that any other transmitter/receiver configuration may be used to generate and receive monopole, dipole, and/or quadrupole waves according to principles described herein, and the methods of processing described above or below may be applied to find anisotropy of a formation while drilling (or according to wireline techniques). Therefore, the LWD tool 30, surface equipment 31, or other devices may comprise a set of instructions that, when executed, implement the methods described herein to find the principal shear directions of a formation even while drilling. One of ordinary skill in the art having the benefit of this disclosure will understand that more advanced tool implementations, including those with additional transmitters, receivers, and/or longer transmitter-to-receiver (T/R) spacings, and more powerful processing capabilities, can be used consistent with the principles described herein.

According to one embodiment, in addition to, or in place of the dipole data used to find anisotropy as described above, monopole and/or quadrupole waves may be excited by an LWD tool to determine formation anisotropy.

It is well known that an omni directional (monopole) source placed on the borehole axis of an isotropic formation only excites an azimuthally symmetric pressure field. However, when the formation is anisotropic, the pressure field exhibits azimuthal variations. In particular, a quadrupole pressure field will be present, provided that the borehole axis is not an axis of symmetry of the formation. The directions perpendicular to the borehole axis along which the quadrupole component of the field is maximal coincide with principal fast/slow shear velocity directions of the formation. Therefore, with an acoustic or sonic LWD tool (in which the LWD tool 30 is essentially a drilling collar with an OD large enough so that the collar wall is relatively close to the borehole wall), the array 66 or ring of individual sensors 60 distributed uniformly around the collar can detect variations in the pressure field. According to one aspect, the fast/slow principal shear axes of the formation are determined from the detected variations in the pressure field. A case study modeled through finite differences is presented below and illustrates the principle of determining the principal shear directions of a formation based on monopole/quadrupole interactions.

Considering again the case of an 8.5" borehole in a transversely isotropic (TI) rock with transverse isotropic properties as shown in the Table 1 above, we assume the borehole axis $X_3$ (FIG. 1) to be perpendicular to the TI or symmetry axis 106 (FIG. 1) of the formation 100 (FIG. 1).

As with the previous simulation, the transmitter is approximated as a ring of point pressure sources in the mud outside the collar and very close to the collar OD. The source signature is the second derivative of the Blackman-Harris window with an 8 kHz center frequency. All point sources in the ring have equal strength (monopole source approximation). The receivers are approximated as rings of pressure sensors (each sensor in a ring is individually recorded) and similarly placed in the mud outside the collar and very close to the collar OD. The transmitter-receivers spacing is in the 4-9 ft range.

As mentioned in the simulation above, using a 3D Cartesian elastic finite differences code allowed orthotropic material properties to be incorporated into the model as long as the principal planes of symmetry were aligned with the gridding planes. We used dx=dy=⅛" (directions perpendicular to the borehole axis), and dz=⅙" (along the borehole axis). Because of the symmetries of the problem, only a 90° section of the model was used in the computer simulation. The full 360° pressure field was reconstructed afterwards.

First we look at the pressure field around the collar as the signal travels along the borehole. FIG. 19 shows VDL (variable density log)-like images of the azimuthal variation of the pressure field in the mud adjacent to the collar wall as the signal travels along the borehole. In FIG. 19, lighter shading indicates positive pressure, and darker shading indicates negative pressure. The azimuthal spacing between sensors is 22.5°. Even at only ⅓ ft away from the source (top panel), the pressure field exhibits a quadrupole component apparent in the later part of the signal (alternating light and dark pattern representing two maximal and two minimal pressure values as one moves around the collar from 0° to 360°). The quadrupole component becomes more clearly defined as the signal travels farther from the source. Focusing on the field at 8 feet from the source (bottom panel), one can notice an early collar arrival at around 0.5 ms, followed by a rock compressional arrival around 1 ms (there is a weak quadrupole component behind that arrival probably due to mode conversion). There is also a weak signal arriving at about 2 ms, which corresponds to the fluid mode inside the collar. The last and strongest signal shows up around 2.5 to 3 ms and clearly exhibits a quadrupole component. The last arrival is a combination of the borehole Stoneley and quadrupole modes as will be more clearly shown below.

Figure 20:
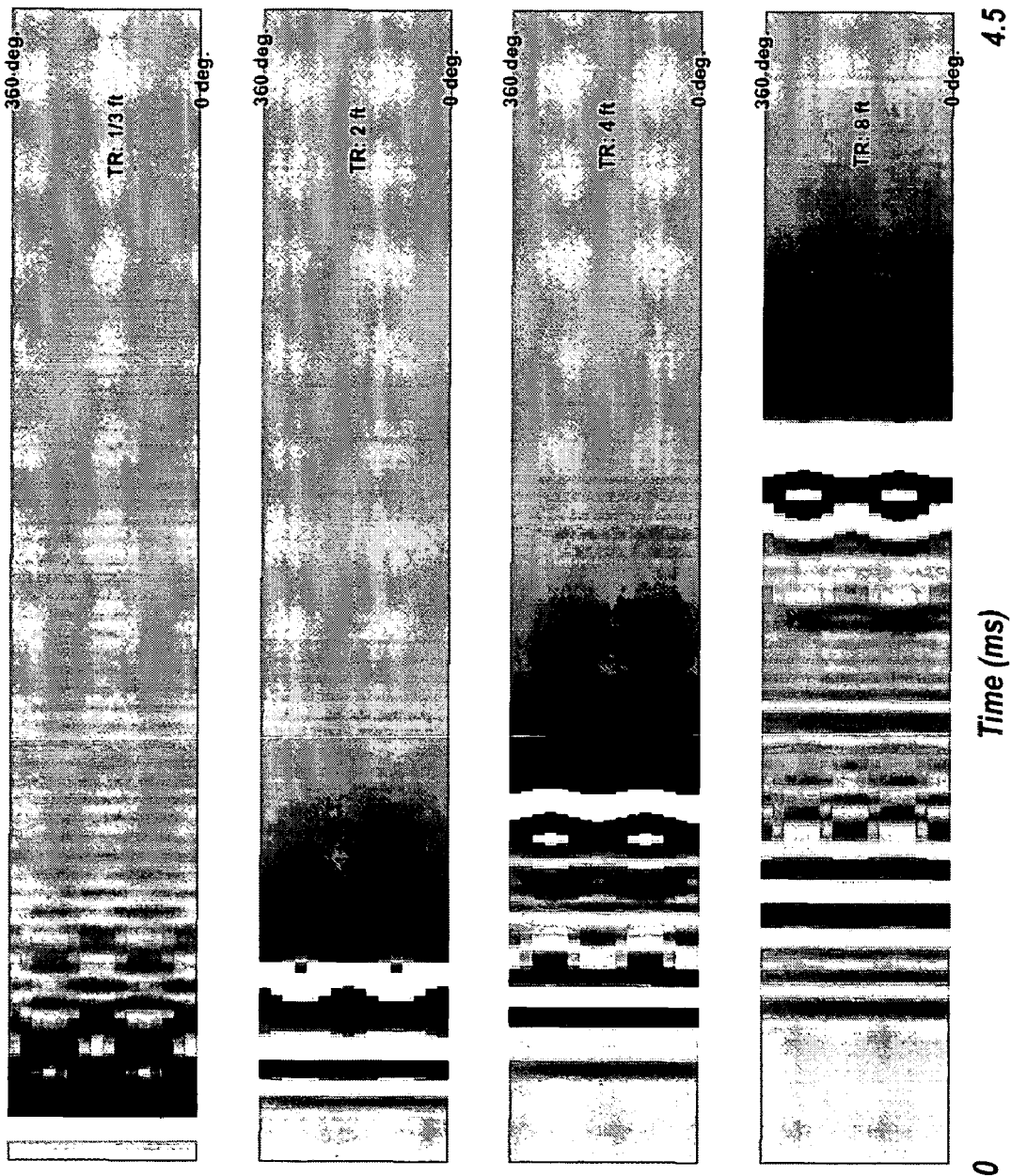
FIG. 20 shows images of azimuthal variation of a pressure field in mud adjacent to a collar wall as an acoustic signal travels along a borehole.
Figure 21:
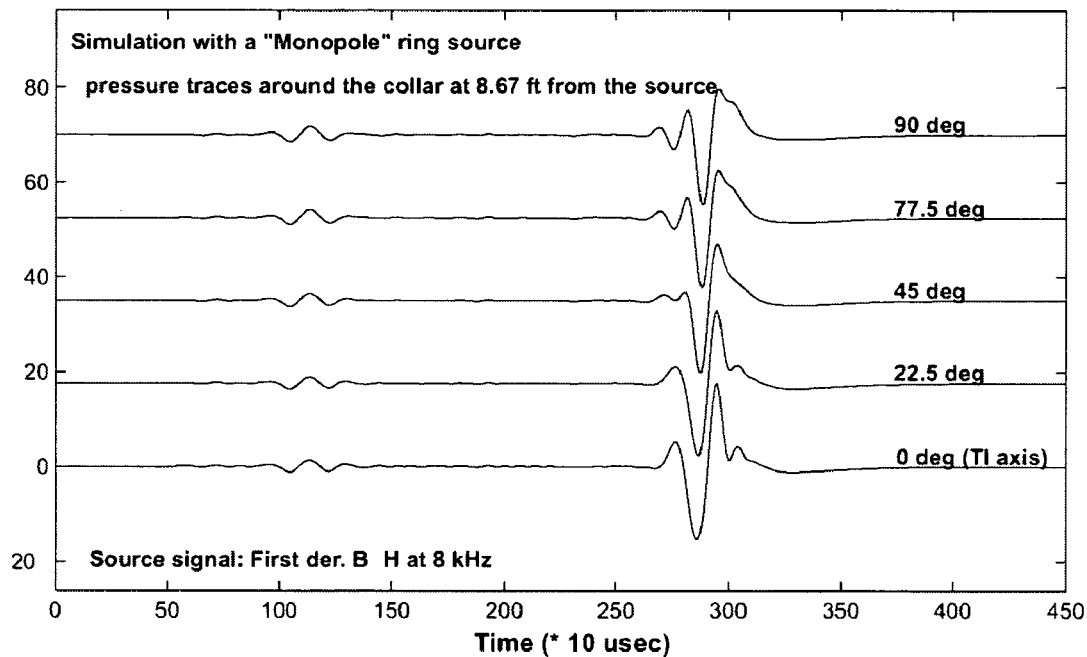
FIG. 21 shows pressure traces recorded by individual sensors around the collar at 8.666 feet from an acoustic source.
Figure 21:
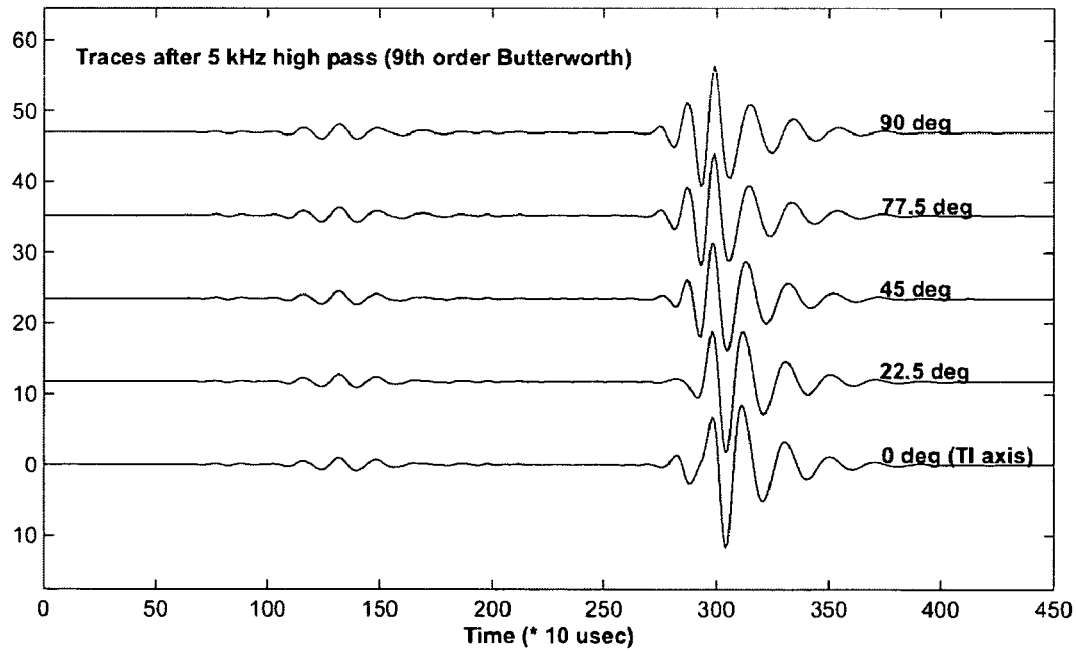

FIG. 20 shows the pressure traces recorded by individual sensors around the collar azimuth at 8⅔ ft from the source. The top panel shows the raw waveforms. The azimuthal variation is apparent. The bottom panel shows the traces after a 5 kHz high-pass filter has been applied to enhance those azimuthal variations. There is a negative move-out when going from the TI (slow) direction to the one perpendicular to it (fast).

Figure 22:
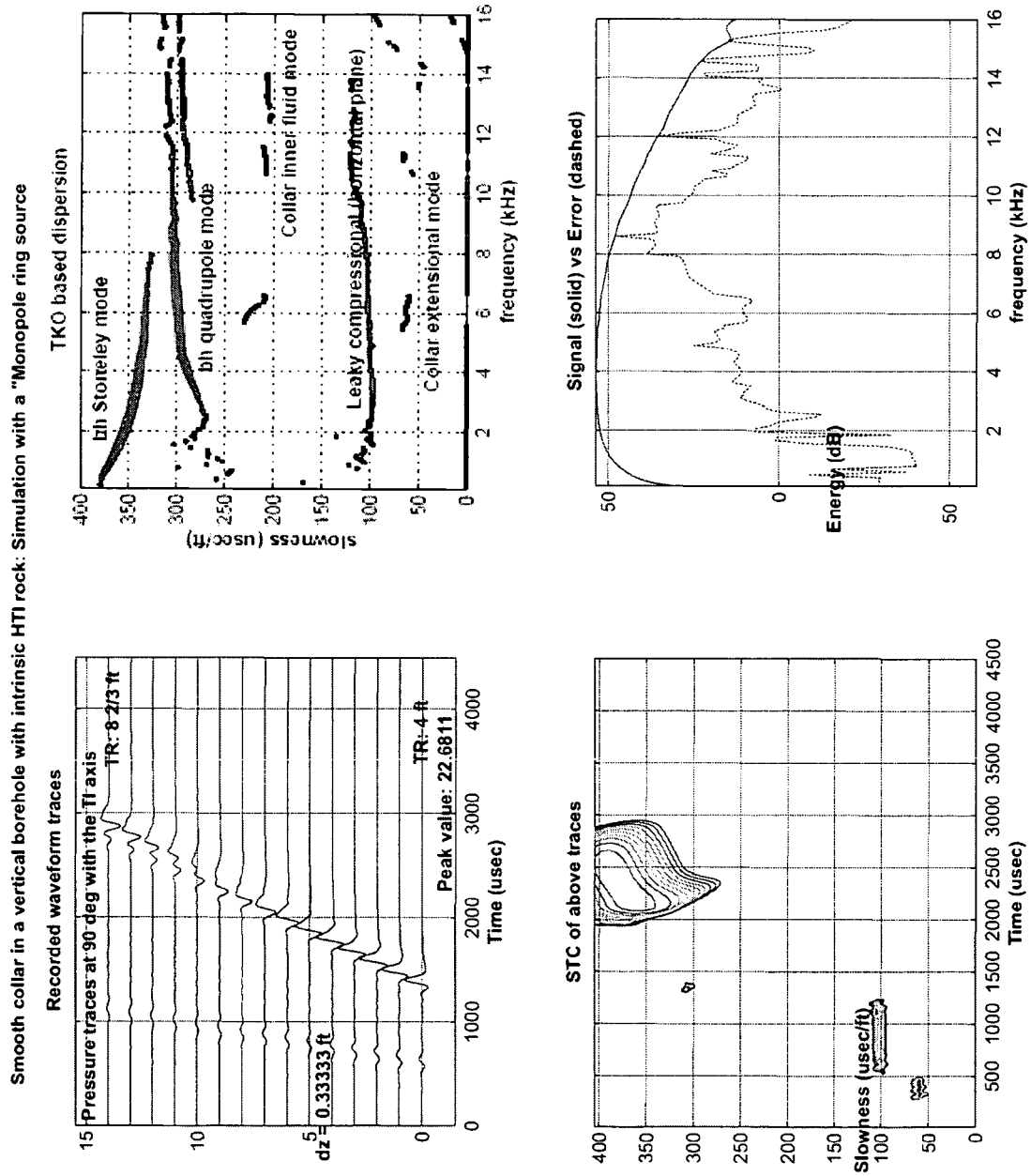
FIG. 22 illustrates TKO and STC (slowness-time coherence) processing of a line of sensors at 90° with respect to a TI (transversely isotropic) axis.

Now we focus on the processing of the traces recorded by lines of receivers along the collar (TR ranging from 4 to 8⅔ ft). The processing of the line of receivers highlights the presence of a quadrupole mode. FIG. 22 shows the TKO and STC processing of the line of sensors at 90° from the TI axis. In addition to the expected Stoneley mode, the traces clearly contain a borehole quadrupole mode. Other modes present in the TKO are the collar inner fluid mode, a leaky compressional mode, and the collar extensional mode. The result indicates that by processing individual lines of sensors along the collar, one can detect evidence of rock anisotropy.

Figure 23:
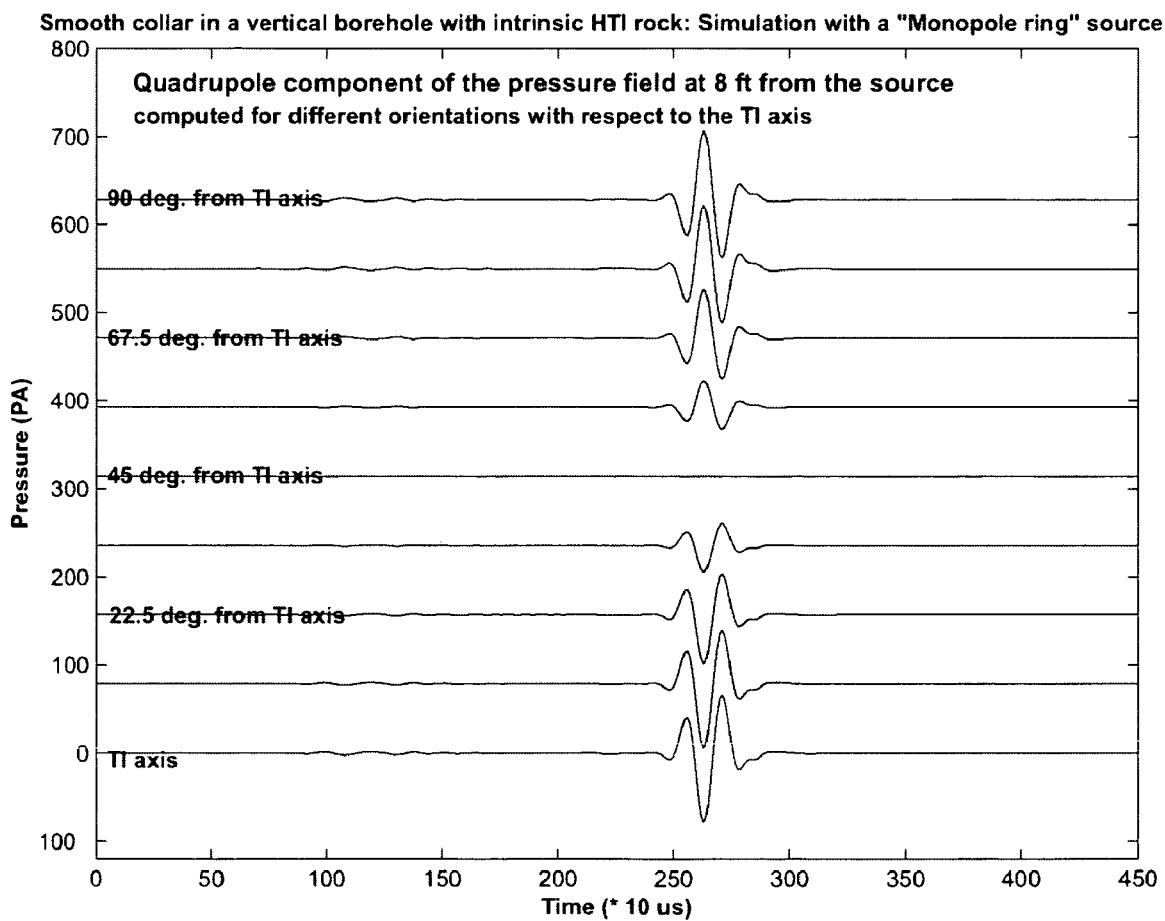
FIG. 23 shows a quadrupole component at 8 feet from the acoustic source computed at different orientations with respect to the TI axis ranging between 0 and 90°.

We next turn our attention to the actual quadrupole component of the pressure field. FIG. 23 shows the quadrupole component at 8 ft from the source computed at different orientations with respect to the TI axis of the rock ranging from 0 to 90°. It is clear in FIG. 23 that the quadrupole field is maximal when computed along the principal axes of the rock (in fact, because of the cos 2θ characteristic of the quadrupole field, the fields at 0 and 90° have the same strength and opposite polarity). Additionally, the quadrupole field is null at 45° with respect to the principal axes of the rock. Therefore, by determining the borehole azimuths along which the quadrupole field is maximal, the principal axes of the rock are identified.

Figure 24:
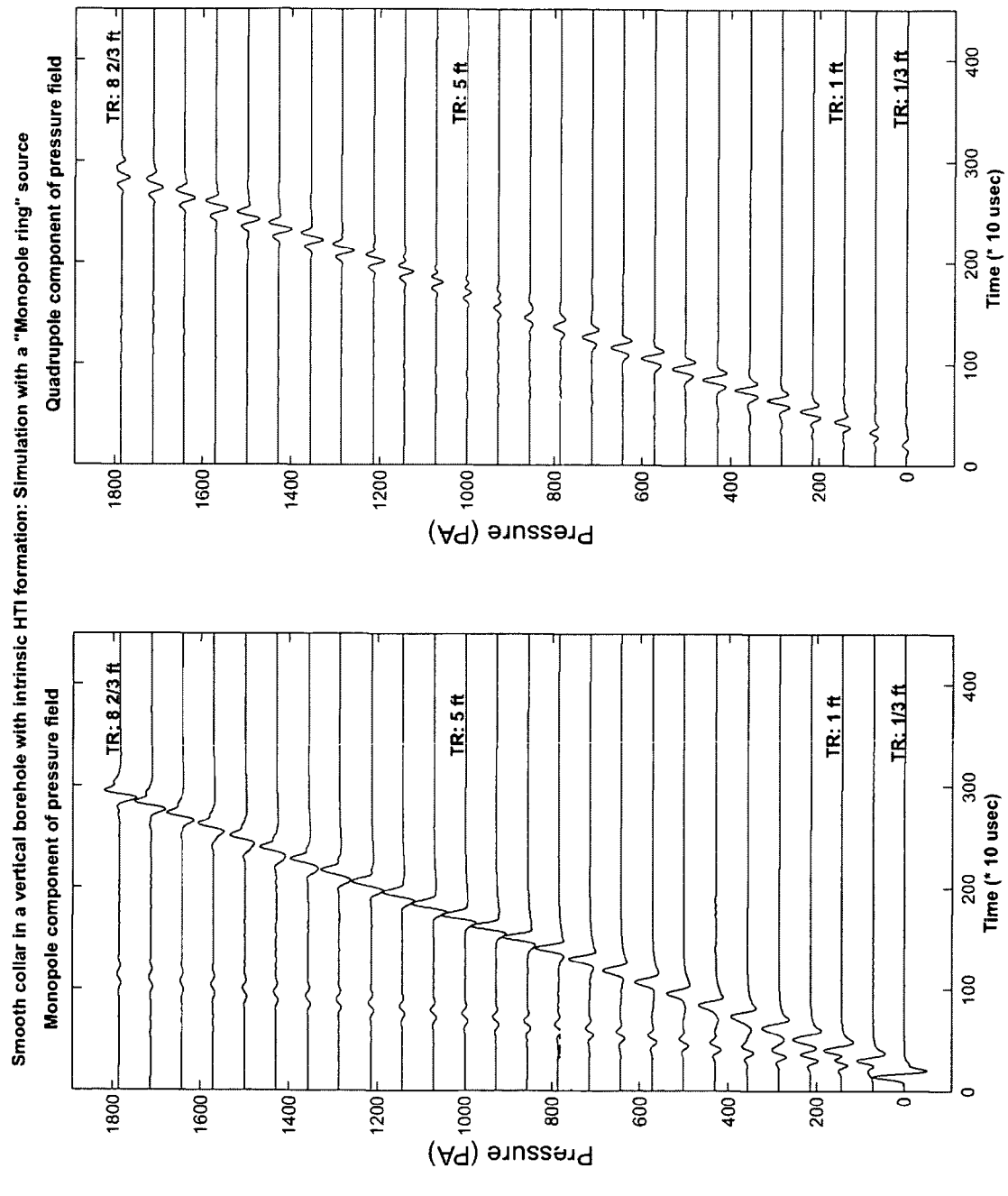
FIG. 24 shows monopole and quadrupole components as the signals travel along the borehole.

Now we process the monopole component of the field, as well as the quadrupole component along the direction of maximal energy (the rock principal axes). FIG. 24 shows the two components as the signal travels along the borehole. The quadrupole component evolves rather quickly as one moves away from the source. The vertical scale is identical in both panels to convey the relative strength of the two components (peak-to-peak ratio of around 2 between monopole and quadrupole). Because of the different speeds of the modes, there is some interference clearly visible in the quadrupole field (weaker field) around 4-5 ft from the source.

Figure 25:
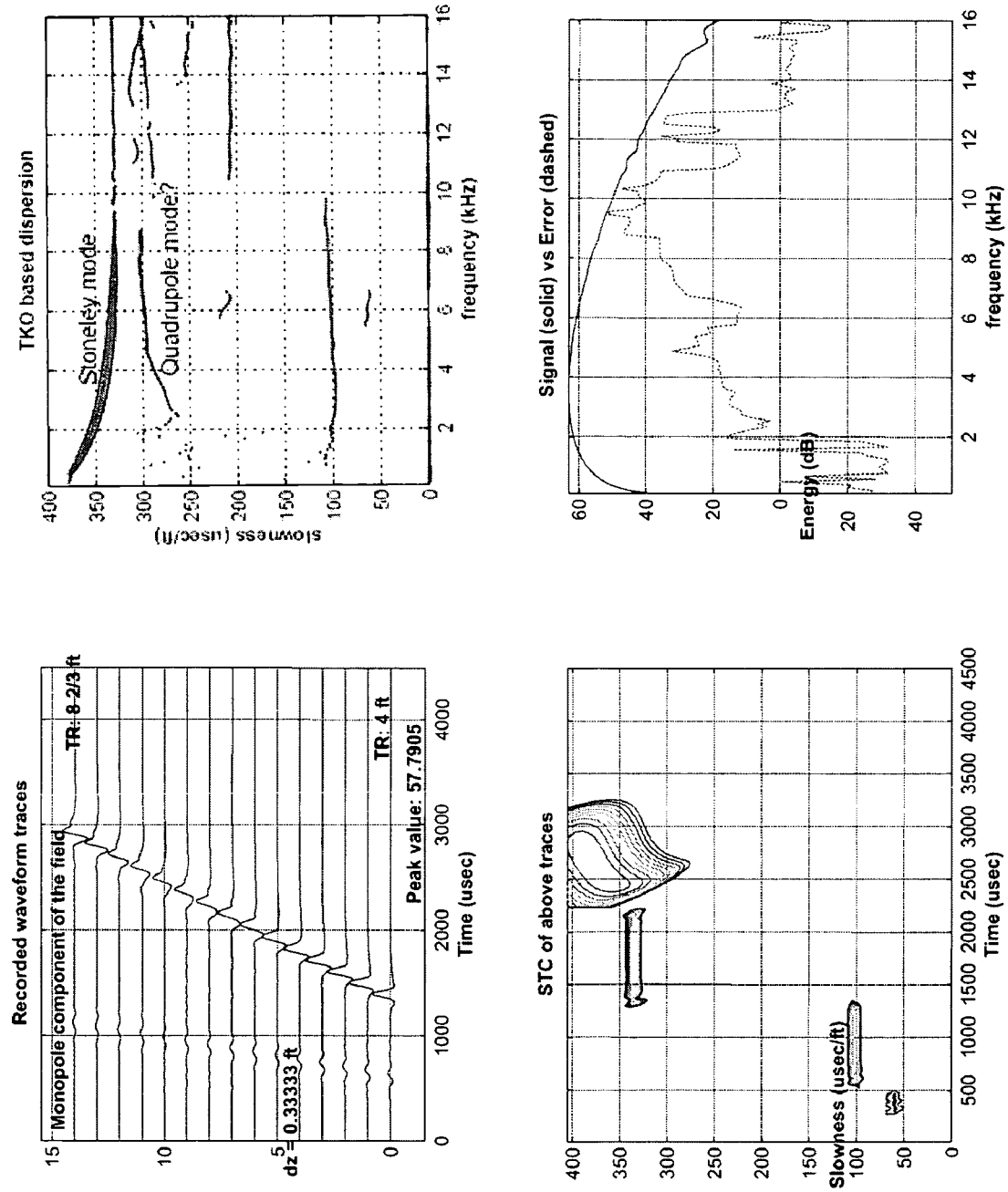
FIG. 25 shows TKO and STC processing of the monopole component of the field.
Figure 26:
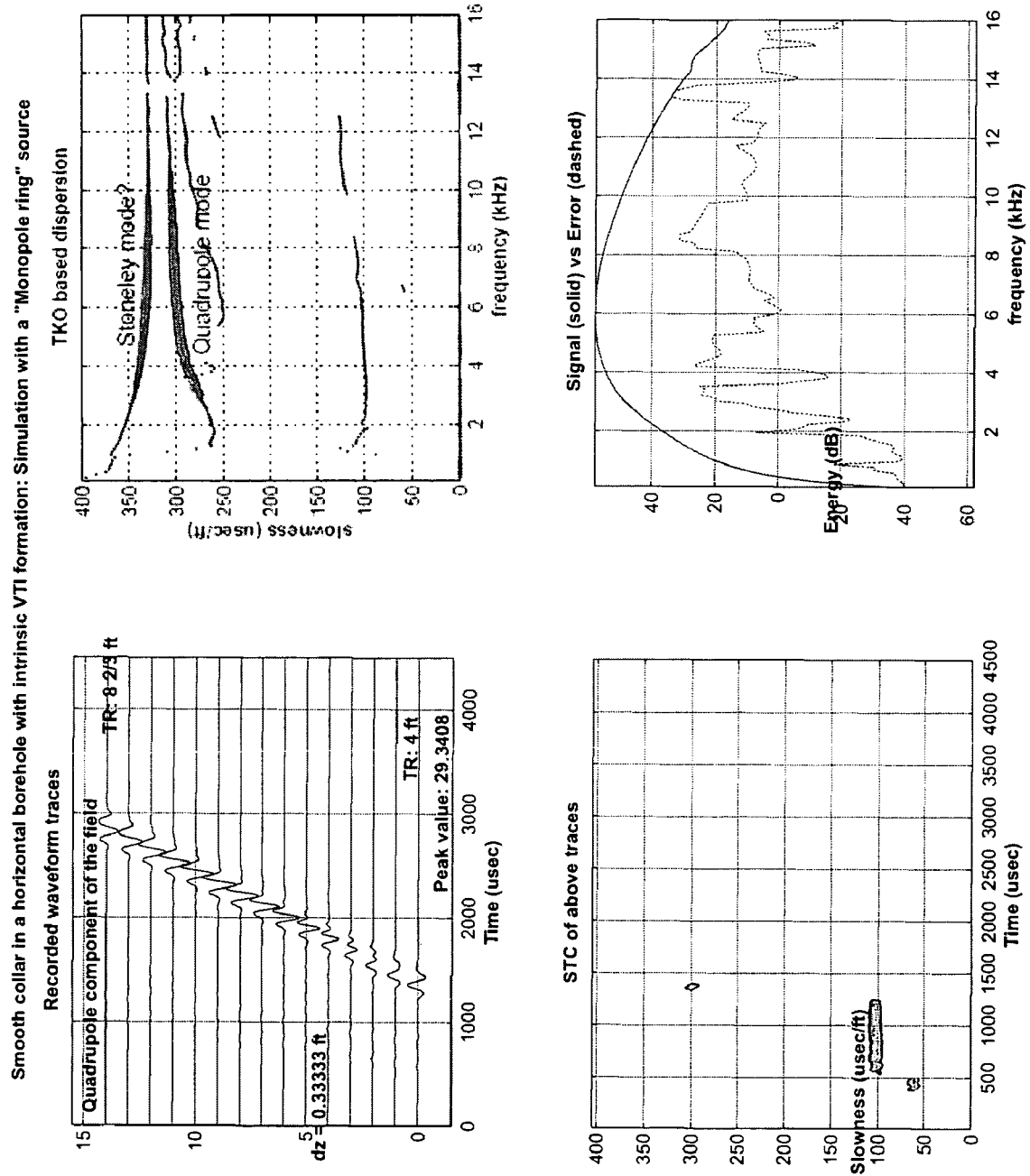
FIG. 26 shows the processing of the quadrupole component of the field.

FIG. 25 shows the TKO and STC processing of the monopole component of the field. One of the most interesting features observed in FIG. 25 is the presence of a mode with a dispersion curve identical to that of the quadrupole mode, as revealed by the TKO in the slowness-frequency plane. The mode with a dispersion curve identical to the quadrupole mode is in addition to the expected monopole modes (a strong Stoneley mode, the inner collar fluid mode, the leaky compressional and a weak collar extensional). FIG. 26 similarly shows the processing of the quadrupole component of the field. One can observe the presence of a mode with a dispersion curve identical to that of the Stoneley mode. The mode with a dispersion curve identical to that of the Stoneley mode is in addition to the expected quadrupole mode (though there are a leaky shear and leaky compressional modes present). Those two results indicate that the Stoneley and quadrupole modes are coupled as a result of the transverse anisotropy of the rock.

Figure 27:
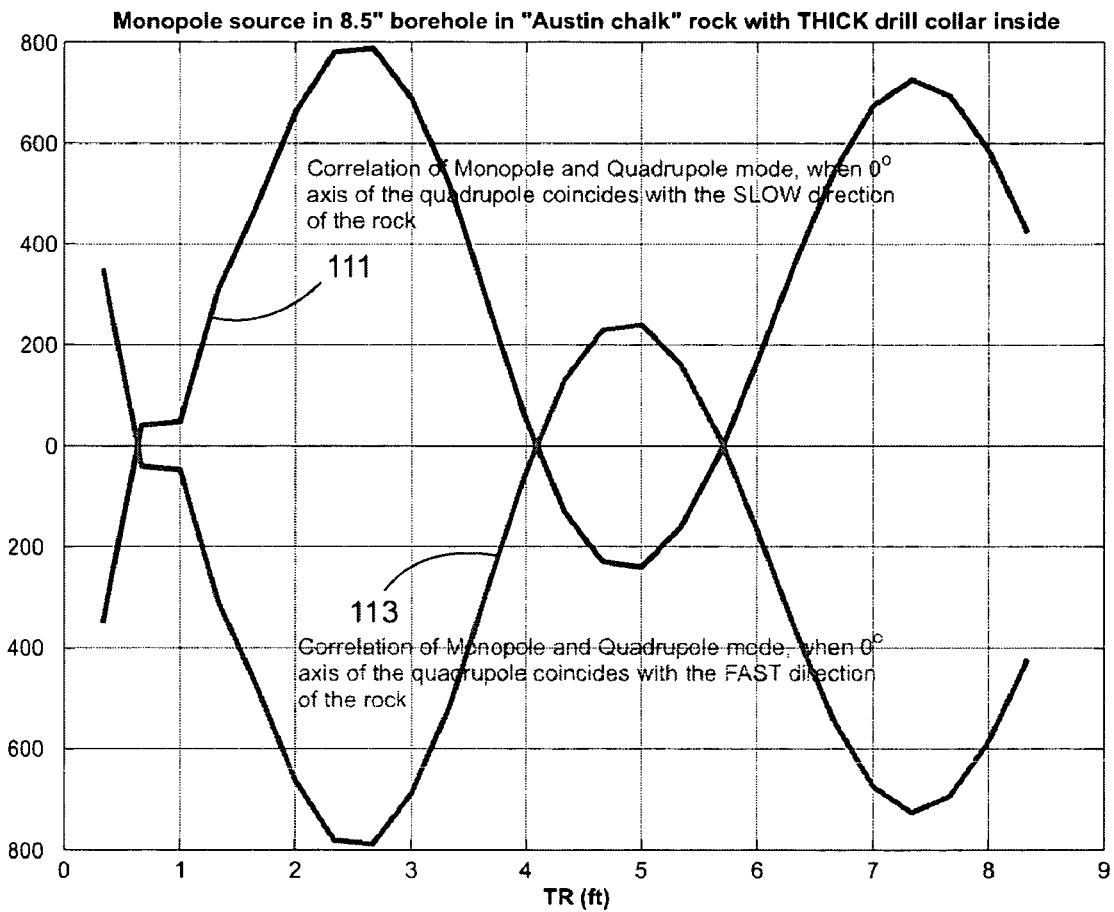
FIG. 27 shows the result of cross-correlating the monopole and quadrupole modes as the moves travel along the borehole axis.

Now we perform a zero-offset cross-correlation between the monopole mode and the quadrupole mode, when the later is computed assuming θ=0 along the slow direction of the rock. The upper curve 111 in FIG. 27 shows the result of the cross-correlation as the modes travel along the borehole axis. It is clear that on average, the resultant value is predominantly positive. In contrast, the lower curve 113 shows the result when the quadrupole is computed assuming θ=0 along the fast direction of the rock. The lower curve 113 is essentially the mirror image of the upper curve 111. The results indicate that the zero-offset cross-correlation of the monopole and quadrupole modes can be used to identify the slow (positive cross-correlation) and fast (negative cross-correlation) directions of the rock.

Accordingly, as shown in the simulated case studies, a monopole source in a vertical borehole through a rock with HTI (horizontal transverse isotropic) anisotropy will result in a pressure field that exhibits azimuthal variation as it travels along the borehole. In particular, the firing of the monopole source can excite a relatively strong quadrupole mode. In a sonic LWD application where the sensors on the collar wall are relatively close to the borehole wall (e.g. a 6.8" OD collar nominally used in an 8.5" borehole or an 8.4" collar nominally used in a 12" borehole), those variations can be detected by a ring of sensors where each sensor is recorded individually. By extracting the directions along which the quadrupole field is maximal, one can identify the principal directions of the rock. The Stoneley and quadrupole modes excited by the monopole source are tightly coupled because of the rock anisotropy. By performing a zero-offset cross-correlation of the monopole and quadrupole modes, with the later aligned with the slow/fast directions of the rock, the result will be predominantly positive along the slow direction and predominantly negative along the fast direction. This behavior can be used to identify the slow/fast directions of the rock.

There are really two canonical quadrupole modes that can be excited in a vertical borehole in HTI rock. One is aligned with the rock principal axes (the one present in this case study) and one at 45 degrees with respect to those axes. This second quadrupole mode is not excited by a monopole source, but will be present if a quadrupole source is used and is not perfectly aligned with the rock principal axes.

Accordingly, in some aspects, firing a transmitter in dipole mode in orthogonal directions and recording and analyzing the in-line and cross-line dipole fields along the borehole with appropriately oriented arrays of sensors can indicate fast and slow azimuthal directions, even when a borehole is being drilled. In some aspects, exciting a monopole mode inductively excites a relatively strong quadrupole mode in the presence of anisotropy also facilitates identification of the principal directions of the formation. The monopole/quadrupole interactions can be monitored to yield the principal fast and slow directions of the formation. Some embodiments comprise combining the results of both dipole and monopole/quadrupole methods to further enhance the accuracy of the principal fast/slow directions identified. The results of each method may be combined and averaged in some embodiments.

The aspects and embodiment described above yield anisotropy both in LWD logging applications and in wireline logging, and therefore the principles described are equally applicable to each. In an LWD application, the methods may be particularly helpful where a large collar OD allows the receiving sensors to be closer to the borehole wall. Similarly, it may be helpful in wireline application when the borehole-to-tool diameter is not too large (e.g. wireline applications in slim boreholes).

Moreover, the methods described above may be replaced, added to, or compared with methods described in U.S. Pat. No. 6,718,266, which is hereby incorporated by this reference. In some embodiments, the methods described in U.S. Pat. No. 6,718,266 are combined with principles described herein to determine principal directions while drilling. Therefore, any combination of performing an Alford rotation, monitoring monopole/quadrupole interactions, and the methods described in U.S. Pat. No. 6,718,266, may be used while drilling to determine anisotropy. Each may be used alone as well.

The preceding description has been presented only to illustrate and describe the invention and some examples of its implementation. It is not intended to be exhaustive or to limit the invention to any precise form disclosed. Many modifications and variations are possible in light of the above teaching. The principles described herein may be used for measuring anisotropy or identifying principal fast/slow directions for a desired location at a given azimuth.

The preceding description is also intended to enable others skilled in the art to best utilize the invention in various embodiments and aspects and with various modifications as are suited to the particular use contemplated. It is intended that the scope of the invention be defined by the following claims.

What is claimed is:

1. A method, comprising:
    measuring anisotropy of a formation while drilling, the measuring anisotropy while drilling comprising:
    exciting a dipole wave mode in two orthogonal directions with an LWD tool;
    receiving and recording in-line and cross-line dipole wave data comprising combined signals resulting from dipole wave propagation through both the formation and the LWD tool;
    performing an Alford rotation of the combined signals to determine anisotropy of the formation, including identifying fast and slow shear directions of the formation;
    exciting a monopole wave mode with the LWD tool;
    receiving monopole wave data and monopole-induced quadrupole wave data resulting from monopole wave propagation through both the formation and the LWD tool;
    finding orthogonal principal shear directions characterizing anisotropy by observing directions in which received quadrupole wave data has maximum energy;
    identifying a fast direction of the two orthogonal directions characterizing anisotropy at a negative correlation between monopole and quadrupole received data; and
    identifying a slow direction of the two orthogonal directions characterizing anisotropy at a positive correlation between the monopole and quadrupole received data.

2. A method according to claim 1, further comprising considering anisotropy measured from the dipole wave data and monopole/quadrupole interaction data to evaluate anisotropy.

3. A method according to claim 1, further comprising averaging results of anisotropy measured from the dipole wave data and the quadrupole data.

4. A method according to claim 1 wherein the receiving dipole, monopole, and quadrupole wave data comprises receiving data at eight receiver stations, each having eight azimuthal sensors.

5. A method of logging a subterranean formation, comprising:
    logging while drilling (LWD) a borehole, the logging while drilling comprising:
    exciting initially a monopole mode with a LWD tool;
    receiving wave data from waves traveling through the subterranean formation; observing any quadrupole modes resulting from the initially excited monopole mode;
    identifying principal shear directions of the subterranean formation while drilling based on the wave data received while drilling by the LWD tool, said identification comprising monitoring monopole/quadrupole interactions.

6. A method according to claim 5 wherein identifying principal shear directions further comprises identifying a fast direction of the principal shear directions and a slow direction of the principal shear directions.

7. A method according to claim 5 wherein identifying principal shear directions of the subterranean formation while drilling further comprises using orthogonal dipole data.

8. A method of logging a subterranean formation, comprising:
    logging while drilling (LWD) a borehole, the logging while drilling comprising:
    exciting initially a monopole mode with a LWD tool;

receiving wave data from waves traveling through the subterranean formation; observing any quadrupole modes resulting from the initially excited monopole mode;

identifying principal shear directions of the subterranean formation while drilling based on the wave data received while drilling by the LWD tool, said identification comprising:

identifying two orthogonal directions, perpendicular to the borehole, along which the quadrupole mode has maximum energy;

identifying a fast of the two orthogonal directions at a negative correlation between the monopole and quadrupole modes;

identifying a slow of the two orthogonal directions at a positive correlation between the monopole and quadrupole modes.

9. A method of logging a subterranean formation, comprising:

logging while drilling (LWD) a borehole, the logging while drilling comprising:

exciting a monopole, a dipole, and a quadrupole mode with a LWD tool;

receiving wave data from waves traveling through the subterranean formation;

identifying principal shear directions of the subterranean formation while drilling based on the wave data received while drilling by the LWD tool, wherein the identification comprises:

performing an Alford rotation on received dipole wave data to identify a first measurement of the principal shear directions;

identifying orthogonal directions, perpendicular to the borehole, along which received quadrupole wave data has maximum energy as a second measurement of the principal shear directions;

identifying a fast of the two orthogonal directions at a negative correlation between monopole and quadrupole received data;

identifying a slow of the two orthogonal directions at a positive correlation between the monopole and quadrupole received data;

comparing the first and second measurements of the principal shear directions.

10. A method according to claim 9, further comprising averaging the first and second measurements of the principal shear directions.

11. An apparatus, comprising:

a logging while drilling (LWD) tool, the LWD tool comprising:

a drill string;

a drill bit attached to the drill string;

a transmitter capable of: dipole firing, exciting monopole, orthogonal dipole, and quadrupole acoustic wave modes, said transmitter being disposed in a drill collar of the drill string;

a receiver comprising at least four orthogonal acoustic sensors disposed in the drill string and spaced from the transmitter;

a set of instructions that, when executed:

perform an Alford rotation on dipole data received from orthogonal dipole firings by the receiver;

identify orthogonal principal shear directions, perpendicular to the borehole, along which received quadrupole wave data has maximum energy;

identify a fast of the two orthogonal directions at a negative correlation between monopole and quadrupole received data; and identify a slow of the two orthogonal directions at a positive correlation between the monopole and quadrupole received data.

12. An apparatus according to claim 11, further comprising at least eight receiver stations, each receiver station comprising a receiver having at least four orthogonal acoustic sensors.

13. An apparatus according to claim 12, further comprising at least eight receiver stations, each receiver station comprising a receiver having at least eight equally-spaced azimuthal acoustic sensors.

14. An apparatus according to claim 11 wherein the set of instructions, when executed, identify orthogonal principal shear directions, perpendicular to the borehole, along which received quadrupole wave data has maximum energy.

15. An apparatus, comprising:

a logging while drilling (LWD) tool, the LWD tool comprising:

a drill string;

a drill bit attached to the drill string;

an acoustic transmitter capable of firing in two orthogonal directions disposed in a drill collar of the drill string and further capable of exciting monopole, dipole, and quadrupole acoustic wave modes;

a receiver comprising at least four orthogonal acoustic sensors disposed in the drill string and spaced from the acoustic transmitter;

a set of instructions that, when executed, identify orthogonal principal shear directions, perpendicular to the borehole, along which received quadrupole wave data has maximum energy, said identification comprises:

identify a fast of the two orthogonal directions at a negative correlation between monopole and quadrupole received data; and identify a slow of the two orthogonal directions at a positive correlation between the monopole and quadrupole received data.

16. An apparatus according to claim 15 wherein the set of instructions, when executed, further perform an Alford rotation on dipole data received by the receiver following a firing of the acoustic transmitter in dipole mode in two orthogonal directions.

17. An apparatus according to claim 15, further comprising at least eight receiver stations, each receiver station comprising a receiver having at least four orthogonal acoustic sensors.

18. An apparatus according to claim 17, further comprising at least eight receiver stations, each receiver station comprising a receiver having at least eight equally-spaced azimuthal acoustic sensors.

* * * * *